US008925059B2

(12) United States Patent
Mackler

(10) Patent No.: US 8,925,059 B2
(45) Date of Patent: Dec. 30, 2014

(54) DYNAMIC TRUST CONNECTION

(75) Inventor: Russell T. Mackler, Avondale, AZ (US)

(73) Assignee: Lockheed Martin Corporation, Bethesda, MD (US)

( * ) Notice: Subject to any disclaimer, the term of this patent is extended or adjusted under 35 U.S.C. 154(b) by 122 days.

(21) Appl. No.: 13/492,176

(22) Filed: Jun. 8, 2012

(65) Prior Publication Data

US 2013/0333009 A1 Dec. 12, 2013

(51) Int. Cl.
*H04L 29/06* (2006.01)
*H04L 9/32* (2006.01)
*G06F 21/31* (2013.01)

(52) U.S. Cl.
CPC .............. *H04L 63/08* (2013.01); *H04L 9/3226* (2013.01); *H04L 9/3234* (2013.01); *H04L 63/083* (2013.01); *G06F 21/31* (2013.01); *H04L 63/0428* (2013.01)
USPC ........ 726/7; 726/2; 726/3; 713/150; 713/168; 713/175; 709/227; 709/238; 709/239

(58) Field of Classification Search
CPC ... H04L 63/08; H04L 63/083; H04L 63/0428; H04L 9/3226; H04L 9/3234; H04L 2209/38; G06F 21/31
USPC ...................... 726/2, 3, 7; 713/150, 168, 175; 709/227, 238, 239
See application file for complete search history.

(56) References Cited

U.S. PATENT DOCUMENTS

| 6,389,462 B1 * | 5/2002 | Cohen et al. ................... 709/218 |
| 6,799,270 B1 * | 9/2004 | Bull et al. ...................... 713/153 |
| 7,233,664 B2 | 6/2007 | Soliman |
| 7,251,635 B2 | 7/2007 | Lam et al. |
| 7,383,366 B2 | 6/2008 | Friedlander et al. |
| 7,624,438 B2 | 11/2009 | White et al. |
| 7,765,590 B2 | 7/2010 | Thomas et al. |
| 7,822,983 B2 * | 10/2010 | Aull et al. ...................... 713/172 |
| 7,827,400 B2 | 11/2010 | Allen et al. |
| 7,870,399 B2 | 1/2011 | Bryant et al. |

(Continued)

FOREIGN PATENT DOCUMENTS

EP    2372947 A1    3/2010

OTHER PUBLICATIONS

Robert W. Twitchell, *Virtual Dispersive Networking™ with SSN*, Dispersive Solutions, Inc. Business Proprietary Information, Jun. 2009, pp. 1-8.

Babbage et al., *The eSTREAM Portfolio*, Apr. 15, 2008, 10 pages.

(Continued)

*Primary Examiner* — Dede Zecher
*Assistant Examiner* — Sarah Su
(74) *Attorney, Agent, or Firm* — Oblon, Spivak, McClelland, Maier & Neustadt, L.L.P.

(57) ABSTRACT

A network authentication system authenticates a connection-request based on a manner that the connection-request traverses the network. In client-server terminology, a server authenticates a client request for connection by examining one or more sequences of network entities (or network nodes) that form entity-patterns. The client pseudo-randomly selects entities of the network to be redirectors that redirect a received connection-request to further redirectors and/or the server. The client generates a different connection-request for each of the redirectors, and each redirector does the same for each of the further redirectors. This results in substantially unique connection-requests transmitted by each entity of the network in connection with the user request. Thus, redirector patterns are substantially unique and may be used for authentication.

20 Claims, 17 Drawing Sheets

(56) References Cited

U.S. PATENT DOCUMENTS

| | | | |
|---|---|---|---|
| 8,015,187 B2 | 9/2011 | Choi et al. | |
| 8,549,296 B2 * | 10/2013 | Driscoll | 713/170 |
| 2002/0143939 A1 * | 10/2002 | Riddle et al. | 709/224 |
| 2005/0081037 A1 * | 4/2005 | Kumagai et al. | 713/175 |
| 2006/0210084 A1 | 9/2006 | Fransdonk | |
| 2007/0022469 A1 * | 1/2007 | Cooper et al. | 726/3 |
| 2007/0044155 A1 | 2/2007 | Pletka et al. | |
| 2007/0168669 A1 | 7/2007 | Jonas | |
| 2007/0261112 A1 * | 11/2007 | Todd et al. | 726/11 |
| 2007/0271598 A1 * | 11/2007 | Chen et al. | 726/4 |
| 2007/0282915 A1 * | 12/2007 | Vosshall et al. | 707/200 |
| 2008/0155670 A1 * | 6/2008 | Umesawa et al. | 726/6 |
| 2008/0228987 A1 * | 9/2008 | Yagi et al. | 710/316 |
| 2008/0313715 A1 * | 12/2008 | Nardone et al. | 726/4 |
| 2009/0193127 A1 | 7/2009 | Merkh et al. | |
| 2009/0217358 A1 | 8/2009 | Kumar et al. | |
| 2009/0276838 A1 * | 11/2009 | Bennett et al. | 726/7 |
| 2010/0030729 A1 * | 2/2010 | Hsu et al. | 707/2 |
| 2010/0058064 A1 | 3/2010 | Kirovski et al. | |
| 2010/0058458 A1 | 3/2010 | White et al. | |
| 2010/0217987 A1 | 8/2010 | Shevade | |
| 2010/0254537 A1 | 10/2010 | Buer et al. | |
| 2010/0260338 A1 | 10/2010 | Haddad et al. | |
| 2011/0004763 A1 * | 1/2011 | Sato et al. | 713/175 |
| 2011/0035601 A1 | 2/2011 | Davidson et al. | |
| 2011/0078239 A1 | 3/2011 | Heen et al. | |
| 2011/0154470 A1 | 6/2011 | Grimes et al. | |
| 2011/0191579 A1 | 8/2011 | Xiao et al. | |
| 2011/0219447 A1 | 9/2011 | Horovitz et al. | |
| 2011/0265180 A1 | 10/2011 | Unagami et al. | |
| 2011/0302628 A1 * | 12/2011 | Mackler | 726/3 |
| 2012/0216035 A1 * | 8/2012 | Leggette et al. | 713/157 |
| 2012/0331534 A1 * | 12/2012 | Smith et al. | 726/6 |
| 2013/0007239 A1 * | 1/2013 | Agarwal et al. | 709/223 |
| 2013/0010624 A1 * | 1/2013 | He et al. | 370/252 |
| 2013/0048706 A1 * | 2/2013 | Nahill et al. | 235/375 |
| 2014/0029607 A1 * | 1/2014 | Vasquez et al. | 370/352 |
| 2014/0040984 A1 * | 2/2014 | Mackler | 726/3 |

OTHER PUBLICATIONS

U.S. Appl. No. 13/563,000, filed by Russell T. Mackler on Jul. 31, 2012.

* cited by examiner

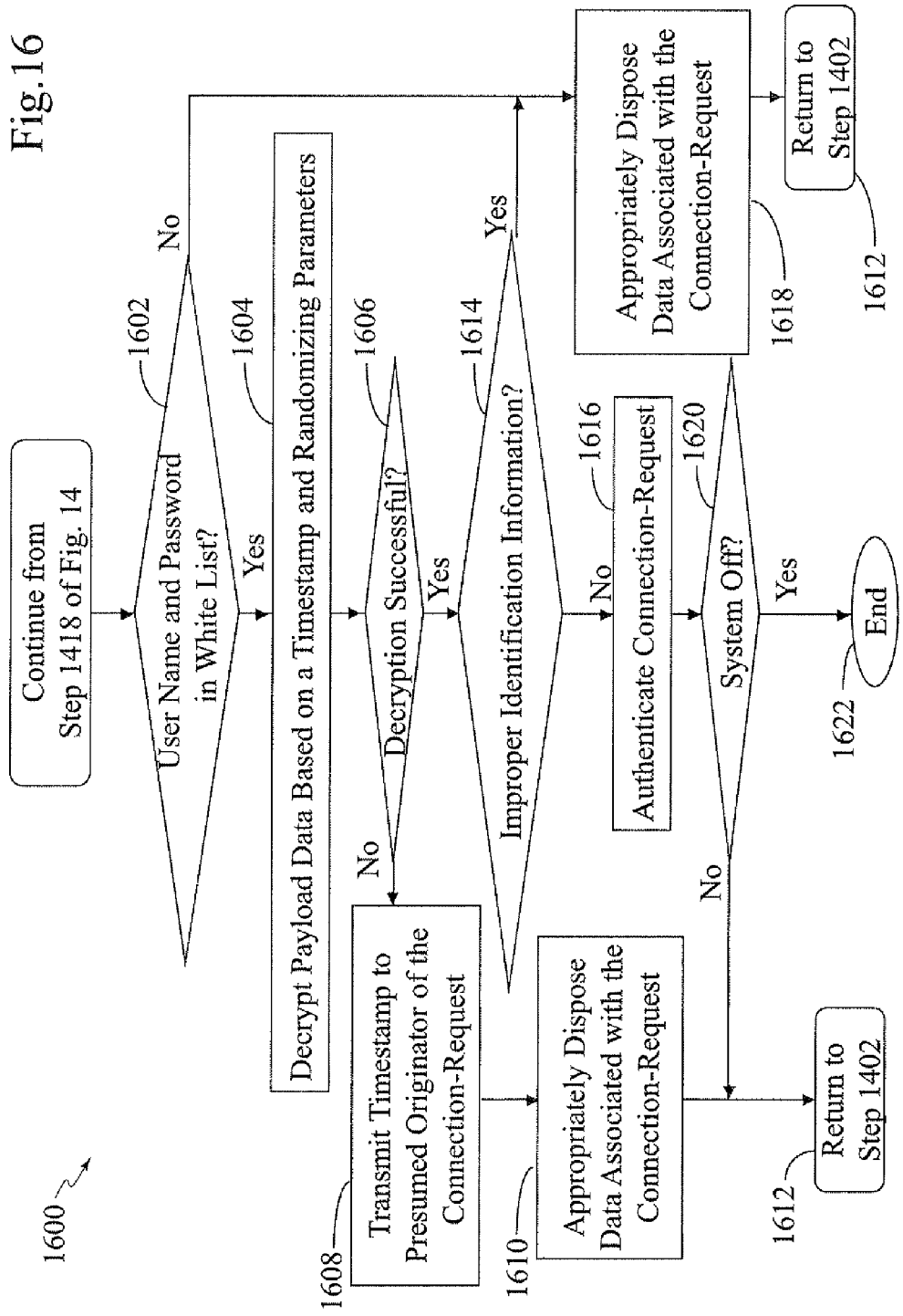

DYNAMIC TRUST CONNECTION

BACKGROUND

Authentication of connection requests are important on public networks such as the Internet to prevent resources from being hijacked by intruders.

SUMMARY

A network authentication system is disclosed that authenticates a connection-request based on a manner that the connection-request traverses the network. A connection-request is generated by a requesting first entity of the network that initiates a chain of entities of the network which end at the desired second entity. For example, in client-server terminology, the first entity may be a client and the second entity may be a server. Instead of using only usernames and passwords for authentication, the server authenticates a client request for connection by examining one or more sequences of network entities (or network nodes) that were part of paths in communicating the connection-request of the client to the server. The sequences of network entities form entity-patterns that may be used for authentication purposes.

After receiving a user request for a connection to a server, the client pseudo-randomly selects entities of the network to be redirectors that redirect a received connection-request to further redirectors and/or the server. The client generates a different connection-request for each of the redirectors, and each redirector does the same for each of the further redirectors. This results in substantially unique connection-requests transmitted by each entity of the network in connection with the user request. Thus, redirector patterns are substantially unique and may be used for authentication. The client and the server portions of the entity-patterns are the same and thus are not as useful for authentication purposes.

After receiving a connection-request, each redirector pseudo-randomly selects the further redirectors and/or the server, and modifies the received connection-request into a modified connection-request before transmitting to the further redirectors and/or server. The received connection-request is modified by at least adding a certification, which may indicate an identification of the redirector. Thus, each modified connection-request includes a redirector pattern that may be compared with one of a set of expected redirector patterns for authentication.

When processing a received connection-request, the redirector or server first locates one or more code words that are disposed in specific one or more locations. The redirector or server includes a table of possible locations and decryption algorithms in its memory and begins to scan the possible locations and decryption algorithms until a valid code word is discovered. Once a code word is decoded, a set of connection-request parameters is identified that either includes or has a pointer to valid redirector patterns. The redirector patterns included in the received connection-request is decrypted and compared to the valid redirector patterns for authentication.

Because more than one redirector pattern may be generated by configuring pseudo-random number generation in each redirector and controlling the possible selections of further redirectors, the redirector patterns may also encode additional information such as instructions for further processing to the receiving redirector. For example, associated with each redirector pattern may be a command to perform redirector processing, to stop processing or to continue with server processing.

When the server receives a connection-request and discovers that it is the requested server, a process is executed that locates and decrypts any usernames and passwords that may have been disposed in the connection-request. For example, the client may have disposed three usernames and passwords in specific locations in the connection-request. The connection-request parameters associated with the one or more code words may include a table of possible locations for the usernames and passwords and identify possible decryption algorithms that may have been used by the client. The server locates and decrypts presumed usernames and passwords. If the presumed usernames and passwords are found in a white list, then a first step of authentication is completed, and the server proceeds to decrypt a payload data portion of the received connection-request.

The server generates a timestamp that may have been used by the client to select a encryption algorithm to encrypt the payload data. The timestamp may be rounded to a preset increment such as a minute, a quarter hour, an hour, etc. Based on a current network delay, a starting timestamp is set that should be earlier than a timestamp used by the client. The timestamp is used to select a decryption algorithm to decrypt the payload data. If the decryption is unsuccessful, the timestamp is incremented and decryption is again attempted. This continues until either a successful decryption is achieved, or it is determined that the payload data cannot be decrypted. If decryption cannot be achieved, the server may send a synchronizing timestamp to the client. If a synchronizing timestamp is received, the client adjusts its timestamp to account for network delays based on the synchronizing timestamp and generate and transmit another set of connection-requests.

If the payload data is successfully decrypted, then further authentication may be achieved by confirming payload data authentication information such as biometric data, media access control (MAC) addresses, etc. The above authentication process may be required to be successfully completed for all received connection-requests that is associated with the initial user request for connection before the connection-request generated by the client is authenticated and control is passed to a session manager.

BRIEF DESCRIPTION OF THE DRAWINGS

Exemplary embodiments are described in detail below with reference to the accompanying drawings wherein like numerals reference like elements, and wherein:

FIG. 16 shows an exemplary flow chart portion for a server authentication process.

DETAILED DESCRIPTION OF EMBODIMENTS

Figure 1:
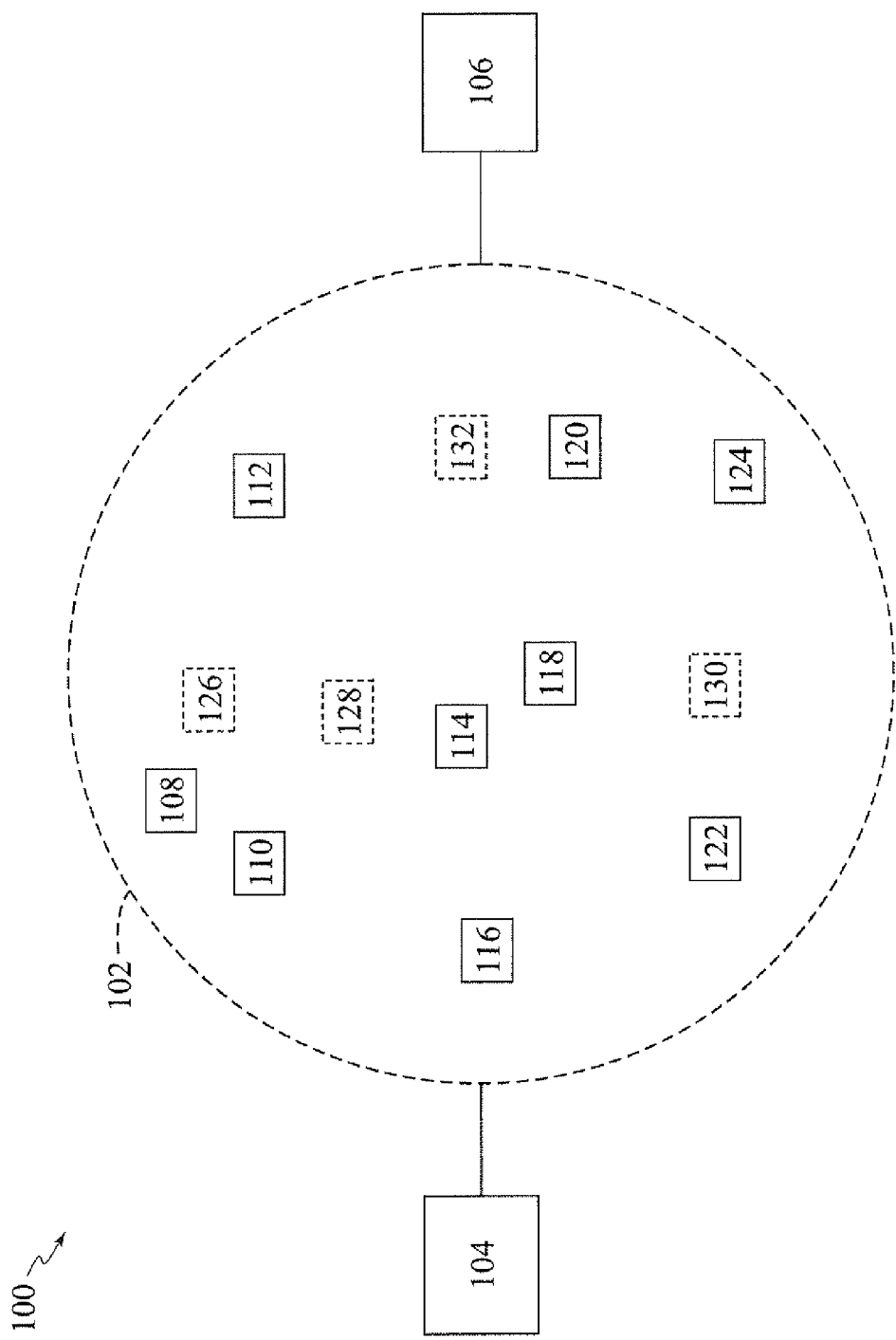
FIG. 1 shows an exemplary diagram of two terminals making an authenticated connection through a network.

FIG. 1 shows entities 104-124 of a system 100 that are interconnected together through a public network 102. Other entities 126-132 that are not part of system 100 may be also connected to network 102. Entities 104-124 may be any electronic equipment that has a capability to be connected to each other through network 102. For example, entities 104-124 may be workstations and for servers that form system 100 of a corporate enterprise. In FIG. 1, entity 104 may be a client (client 104) and entity 106 may be a server (server 106) using the client-server terminology as an example. Although other relationship models may be used such as peer-to-peer model, the client-server model is used as an example. Client 104 sends a connection-request to server 106 to obtain services offered by server 106. To prevent unauthorized access, each of the entities 104-124 may perform an authentication process to authenticate the connection-request originating from client 104 and permit access to services of server 106 only after successful authentication.

Figure 2:
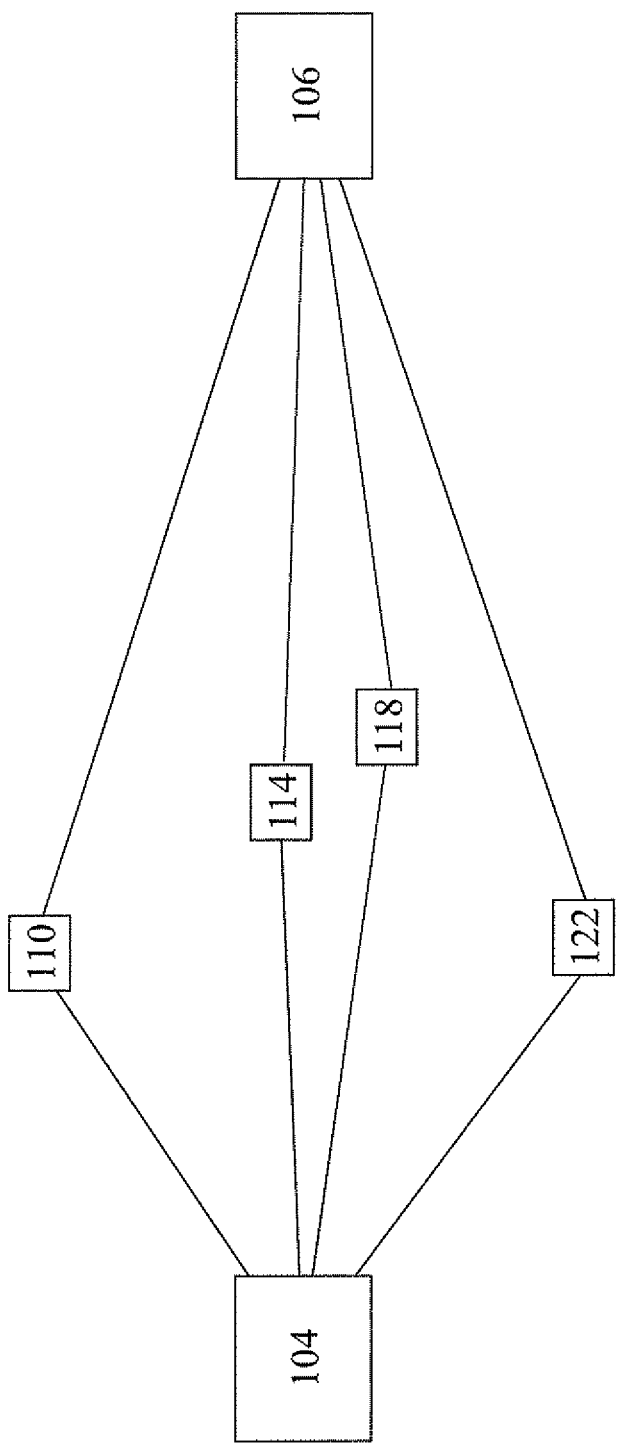
FIG. 2 shows the two terminals authenticating through network redirectors that are pseudo-randomly selected.

Instead of relying only on a username and a password for authentication, server 106 also authenticates client 104 by confirming a way that client 104's connection request traversed network 102 to server 106 in combination with a content of the connection-request. For example, client 104 may initially send the connection-request to selected ones of entities 108-124 that act as redirectors. As shown in FIG. 2, entities 110, 114, 118, and 122 are selected as redirectors 110, 114, 118 and 122 for a current connection-request. A different set of entities 108-124 may be selected to be redirectors for another connection-request, so that a substantially unique set of redirectors corresponds to each connection-request.

Redirectors 110, 114, 118, and 122 may modify the connection-request by adding certifications substantially unique to each redirector 110, 114, 118, and 122 at specific locations in the modified connection-request, for example, before forwarding the modified connection-requests to server 106. A certification could be simply the redirector's media access control (MAC) address encrypted by an encryption algorithm, for example. A more complex certification can be used such as pseudo-randomly reordering contents of a modified connection-request and burying an encrypted redirector identification at a pseudo-randomly selected location, for example.

Entities 108-124 may be pseudo-randomly selected based on connection-request randomizing parameters, token-hashing algorithms, etc., for example. Additionally, client 104 may randomize and encrypt contents of the connection-request to further secure the connection-request authentication process by reducing an ability of a possible intruder from investigating or discovering the authentication process.

Entities 104-124 maintain a passive listening posture as viewed externally from each of entities 104-124, so that an intruder, if monitoring, would not be able to detect any response to any data associated with a connection-request sent to any of entities 104-124. From this perspective, there is no attempt to ensure that all transmitted data is received such as an acknowledgement scheme, for example. Data transmitted to an entity 104-124 may be lost due to various conditions in network 102. The authentication process allows for a certain percentage of lost transmitted data by redundantly including information in connection-requests, for example. Each of entities 104-124 may actively accumulate data received from designated communication channels and determine whether any of the received data is a connection-request.

A designated communication channel may be assigned a destination identity that is placed in transmitted data intended to be received by the corresponding communication channel. The designated communication channels for one entity 104-124 may be different from designated communication channels of other entities 104-124 and may be changed from time to time. For example, each entity 104-124 may include a table of all destination channel combinations for itself and for all other entities that it can transmit to. The table may be organized based on a date-time increment. In this way, the destination identities may be changed for all entities 104-124 for every date-time increment. At any moment, all entities 104-124 have in its memory all destination identities to which it is configured to transmit connection-requests as well as the destination identities that it inputs data.

Figure 3A:
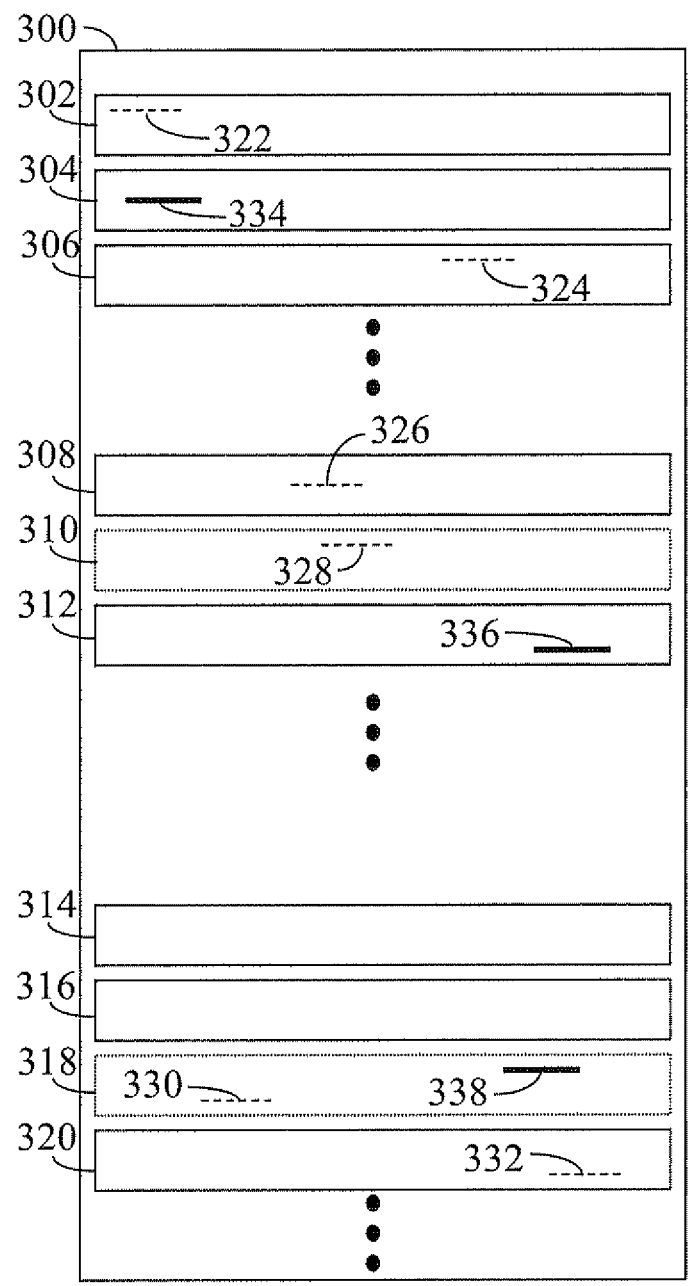
FIG. 3A shows an exemplary diagram of a connection-request.

If a connection-request is discovered in the received data, entities 104-124 test whether the connection-request is legitimate and, if legitimate, what process should be performed. For example, when entity 110 receives data from client 104, the received data is stored and examined in view of other data that had been received to determine if a legitimate communication is present. All received data is referred to as data even though portions of data may be transmitted in separate groups and received at different times. FIG. 3A shows an example of data received by one of entities 104-124 such as entity 110. Data 300 represents a collection of all data received in connection with a connection-request. Data 300 includes data groups 302-308, 312-316 and 320. A data group may be a collection of data that are transmitted and received together. Data groups 310 and 318 would have also been included, but these were lost in network 102 due to unforeseen circumstances. As noted above, the authentication process accounts for lost data.

Figure 3B:
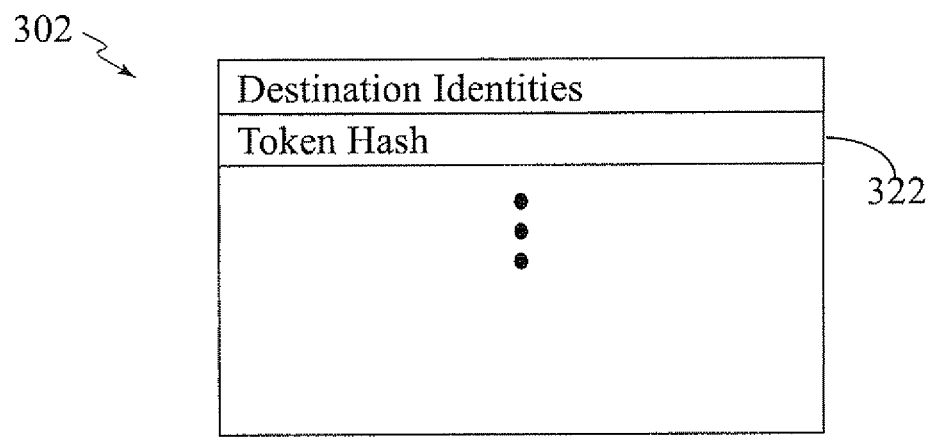
FIG. 3B shows an exemplary diagram of a data group that contains a code word.

Although data 300 is saved in a memory, entity 110 has to determine which data groups should be collected together to form data 300 of a legitimate connection-request. To facilitate initial detection of a legitimate connection-request, code words may be placed at specific locations in the connection-request. For example, in FIG. 3A, code words 322, 324, 326, 328, 330 and 332 are included at specific locations for such purposes. FIG. 3B shows an exemplary diagram of data group 302 that includes a code word 322, and FIG. 3B shows an exemplary diagram of data group 312 that includes usernames and passwords 336. However, code words 328 and 330 are lost, but code words 322, 324, 326 and 332 are received and the connection-request can be fully processed. As shown in FIG. 3A, the code words may be placed in different locations in every data group. The code words may be pseudo-randomly distributed in the data group based on one or more preset pseudo-random seeds, so that efforts of a potential intruder may be further thwarted.

For example, entity 110 may have stored a code-word-location table of one or more locations where one or more code words may be placed. If only a single fixed location is used, the degree of protection may be reduced. On the other hand, the amount of processing required by entity 110 is also reduced. So a trade-off may be made with respect to a degree of protection and required processing power. Each of the entities 104-124 may have stored a code-word-location table. At client 104, one or more code words are placed in a connection-request at pseudo-randomly selected locations obtained from the code-word-location table. At a receiving entity 104-124, data at each of the locations in the code-word-location table is presumed to contain a code word until proven otherwise by failed decryption attempts, as discussed below.

Figure 4:
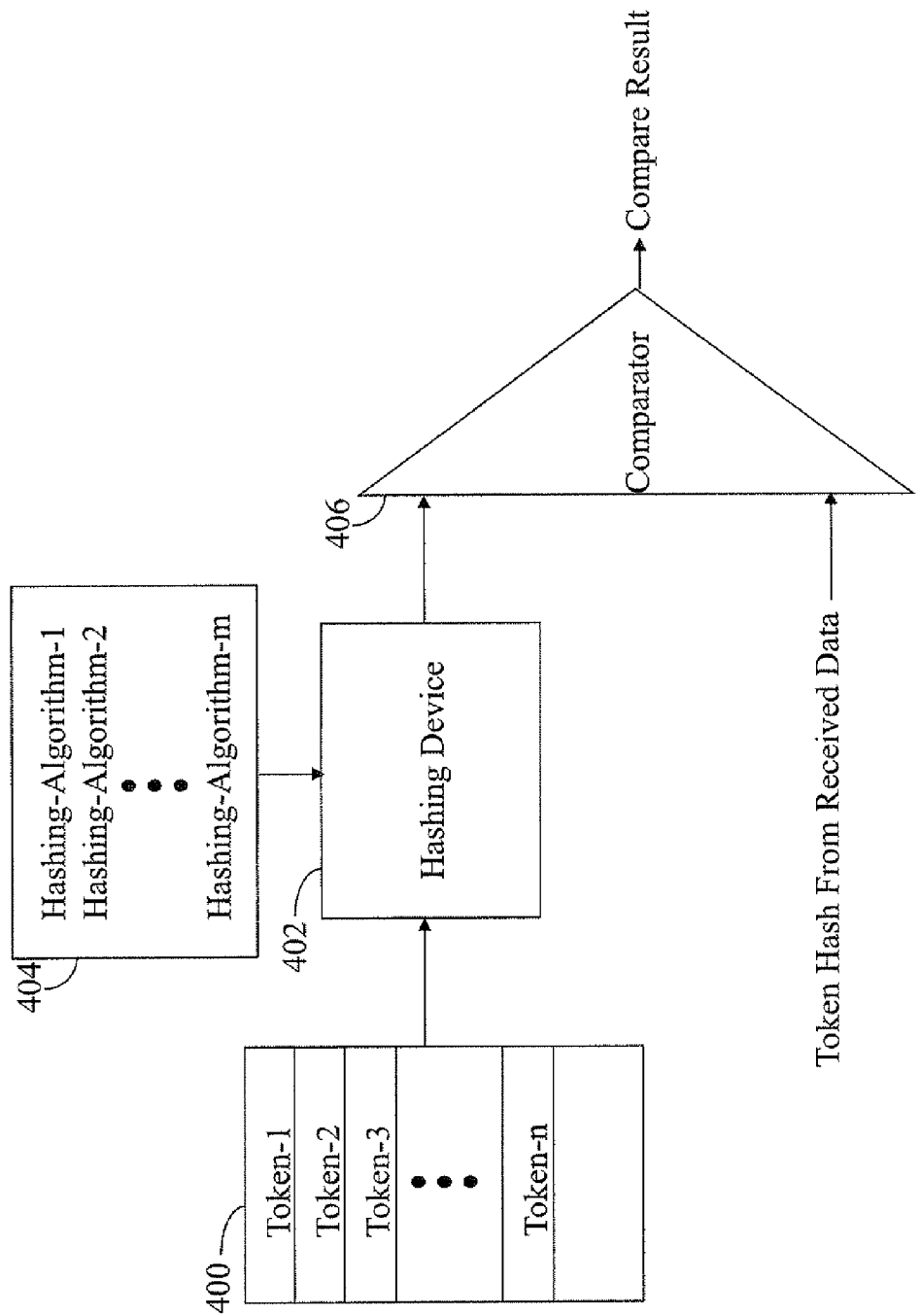
FIG. 4 shows an exemplary block diagram of a code word decoder.

FIG. 4 shows an example for decoding a code word where multiple tokens 400 (token-1 to token-n) may be used and the tokens may be hashed by one or more hashing algorithms 404 (hashing-algorithm-1 to hashing-algorithm-m). Token-hashing algorithms are well known. For example, RSA Secure ID provides token-hashing software or a hardware that generates token hashes every fixed time increment. See www(dot)emc (dot)com/ssecurity/rsa-secured.htm, for example. A token may be a 16 bit word selected to increase difficulty of illicit decryption of a hashing result. A hashing-algorithm generates a code word based on a token in such a way that it is very difficult to obtain the token from the code word. One or more tokens 400 (tokens 400) may be stored as a table in memory and similarly for hashing-algorithms 404. A comparator 406 compares the presumed code word with a code word generated by a hashing device 402 based on one of the tokens and one of the hashing-algorithms. If a compare result is negative, entity 110 continues with another token-hashing-algorithm combination until either a positive compare result is obtained or all token-hashing algorithm combinations are exhausted.

Components shown in FIG. 4 may be implemented using various technologies such as PLAs, PALs, application specific integrated circuits (ASICs), off the shelf processors, and/or software executed in one or more general purpose or special purpose processors using one or more CPUs, for example. Memory, that may be included for storing tokens 400 and/or hashing-algorithms 404, may be implemented using hard disk, optical disk, and/or RAM/ROM in either volatile or nonvolatile technologies.

The code-word decoding result may point to a set of connection-request parameters for deciphering remaining relevant portions of the data needed by entity 110 to perform its tasks. In this way, the meaning of any code word cannot be easily determined even if a code word is successfully located and decoded. For example, sets of connection-request parameters may be stored in memory and the code-word decoding process results in a pointer to one of the sets of the connection-request parameters. If the decoding result does not point to any of the sets of connection-request parameters, then entity 110 moves on to a next possible location. This process continues until a code word is discovered that points to a valid set of connection-request parameters. If after the searching process, a valid code word is not discovered, then relevant portions of the received data may be appropriately disposed by deleting or saving for future intrusion analysis.

If multiple code words are discovered, all the decoded code words may point to a same set of connection-request parameters, or each of the decoded code words may point to a location of another code word and so on in a daisy chain manner. In the end, a set of connection-request parameters is identified. The identified set of connection-request parameters may include all decryption algorithms that may have been used for encryption, indicate how many data groups are needed, and include parameters for ordering different data groups of the connection-request into an intended sequence, etc. Any number of layers of decryption may be implemented. For example, the decrypted code word may point to a first connection-request parameters that include a decryption algorithm which decrypts another code word located in a different portion of the connection-request.

Although FIG. 2 shows one layer of redirectors 110, 114, 118, and 122, multiple layers of redirectors may be implemented. For example, redirector 110 may send its modified connection-request to entity 112 as redirector 112, and redirector 112 redirects a further modified connection-request to server 106 or to yet another entity 110-124 as a redirector. A number of redirectors 104-124 may be different for each connection-request generated by client 104. In this way, the manner that a connection-request is transmitted through network 102 may serve as part of the authentication process.

Entity 106 as a member of system 100 may listen to its designated communication channels and perform the process described above to determine legitimate communications. When sufficient successful decoding is accomplished to indicate that client 104 is requesting connection to entity 106 as a server for its services, server 106 may perform further decoding using information that may not be available to other entities 108-124. Entities 104 and 106 would both have this information so that client 104 and server 106 may correctly communicate with each other. Thus, although entities 104-124 may have common information for processing received data, each of the entities 104-124 may have unique information that permit further decoding to determine the functions that are requested by the connection-request. For example, server 106 may perform decryption that can only be performed by an ultimate target designated by an initiating entity 104-124. Similarly, redirectors may be privy to information that only the designated redirector may decrypt.

In this example, client 104 may have designated server 106 as an ultimate target. However, the connection-requests generated by client 104 may not include a designation of server 106 as the ultimate target. Client 104 may designate server 106 as the ultimate target by encoding information in the data of the connection-requests so that the manner in which the connection-requests find their way to server 106 designates server 106 as the ultimate target.

For example, the tables below illustrates how entities 106-124 may propagate the connection-request originated from entity 104.

TABLE 1

| Redirectors | | | | |
|---|---|---|---|---|
| 104 | 1, 2, 3, 4 | | | |
| 106 | | | | 1, 2, 3, 4 |
| 108 | | | | |
| 110 | | 1 | | |
| 112 | | | | |
| 114 | | | 2 | |
| 116 | | | | |
| 118 | | | 3 | |
| 120 | | | | |
| 122 | | | 4 | |
| 124 | | | | |

TABLE 2

| Redirectors | | | | | |
|---|---|---|---|---|---|
| 104 | 1, 2, 3, 4 | | | | |
| 106 | | | 1 | 4 | 3 | 2 |
| 108 | | | | 4 | 3 | |
| 110 | | 1 | 3 | 2 | | 2 |
| 112 | | | 2 | 3 | | |
| 114 | | 2 | 3 | 4 | | |
| 116 | | | 1 | | 2 | |
| 118 | | 3 | 4 | | | 2 |
| 120 | | | 4 | 2 | | |
| 122 | | 4 | | | 2 | |
| 124 | | | 3 | 4 | | 2 |

Table 1 shows the example of FIG. 2. The left column lists all the possible redirectors 104-124, the right columns indicate the progression of the connection-requests or modified connection-requests through network 102. Each column indicates a node of network 102 that received a connection-request. The numbers in boxes at intersections between the rows and columns indicate a chain of modified connection-requests starting with the original connection-request at the second column from the left. Thus, in Table 1, client 104 starts four chains 1, 2, 3, and 4 by sending four different connection-requests, one to each of redirectors 110, 114, 118, and 122. Each of entities 110, 114, 118, and 122 consults a respective connection-request parameters pointed to by one or more code words in the respective received connection-request, for example. Each respective connection-request parameters may indicate that entities 110, 114, 118, and 122 are redirectors that is instructed to redirect a respective modified connection-request to entity 106. Thus, redirectors 110, 114, 118, and 112 modify the received respective connection-requests and send corresponding modified connection-requests to server 106. In this case, server 106 determines based on data in the four received modified connection-requests and the pattern of redirectors (redirector pattern) that it is the ultimate target. Server 106 may also determine that the originating requesting entity is client 104 by the redirector pattern and/or contents of the connection-requests. For example, the connection-request parameters may point to a redirector pattern table that specifies entity 106 as the ultimate target if a connection-request is received from each of entities 110, 114, 118, and 122.

Table 2 shows another possible redirector pattern that may have been generated by the four connection-requests transmitted by client 104. Here, as before, client 104 transmits four connection-requests, one to each of redirectors 110, 114, 118, and 122. But, instead of the chains that are shown in Table 1, a completely different set of four chains are generated, all of which end at server 106. These different chains may be generated based on contents of the connection-requests transmitted by client 104 and on each redirector's pseudo-random selections. For example, in each of the connection-request, one or more code words were included that points to a pseudo-random number or a pseudo-random number seed that may specify a different number of modified connection-requests to generate and to transmit each of the modified connection requests to different entities 104-124. Thus, modified connection-requests that are generated in one of redirectors 110, 114, 118, and 122 are different from that of other redirectors 110, 114, 118, and 122. In Table 2, redirector chains are:

1. 104, 110, 116, and 106;
2. 104, 114, 112, (110, 120), (116, 122), (110, 118, 124), and 106;
3. 104, 118, (110, 114, 124), 112, 108, and 106; and
4. 104, 122, (118, 120), (108, 114, 124), and 106.

Not counting client 104 and server 106, chain 1 has two links, chain 2 has five links, chain 3 has four links, and chain 4 has three links. In link 3 of chain 2, redirector 112 transmitted two modified connection-requests to redirectors 110 and 120. For link 4 of chain 2, four possibilities are introduced:

1. redirector 110 transmitted a modified connection-request to redirector 116 and redirector 120 transmitted a modified connection-request to redirector 122. This results in redirector patterns 114-112-110 at redirector 116 and 114-113-120 at redirector 122;
2. redirector 110 transmitted a modified connection-request to redirector 122 and redirector 120 transmitted a modified connection-request to redirector 116. This results in redirector patterns 114-112-120 at redirector 116 and 114-112-110 at redirector 122;
3. redirector 110 transmitted modified connection-requests to redirectors 116 and 122, and redirector 120 did not transmit a modified connection-request. This results in redirector patterns 114-112-110 at redirectors 116 and 122; or
4. redirector 110 did not transmit a connection-request, and redirector 120 transmitted modified connection-requests to redirectors 116 and 122. This results in redirector patterns of 114-112-120 at both redirectors 116 and 122.

Each of the above possibilities results in a unique redirector pattern that may be detected by server 106 in addition to contents of the data received from each of the modified connection-requests.

Link 2 of chain 3 has 3 redirectors 110, 114, and 124, but link 3 of chain 3 has only one redirector 112. Similar to link 4 of chain 2 discussed above, many possibilities of redirector patterns may be introduced. The actual redirector pattern may be determined by the connection-request parameters in each of the redirectors and information received through the modified connection-requests from the prior link. Although, as discussed above, server 106 may use redirector patterns in conjunction with contents of modified connection-requests to determine if it is the ultimate target, each entity 104-124 may also use redirector patterns and contents of original or modified connection-requests to encode or decode information. The result of the decode process may determine its role in the authentication process, for example. In this way, difficulties for an intruder to spoof the authentication process are dramatically increased.

The connection-request parameters may include a pointer to a redirector-pattern table in a memory of entity 116 that translates the redirector pattern into instructions for further processing. For example, the redirector-pattern table for entity 116 may be as follows:

| | Redirector-Pattern Table | | | |
|---|---|---|---|---|
| Entity 116 | Input Redirector Pattern | Output Destination(s) | Role | Other Parameters |
| i | 114-112-110 | 118 | Redirector | ... |
| i + 1 | 114-112-120 | 124, 110 | Redirector | ... |
| . | | | | |
| . | | | | |
| i + j | 106-124 | 122, 106 | Redirector | ... |
| . | | | | |

Although in the redirector-pattern table for entity 116, only one set of output destinations are listed for illustration, multiple sets of output destinations may be included, and entity 116 may pseudo-randomly select one of the sets of output destinations for sending modified connection-requests that it generates for this connection-request.

After determining that it is the ultimate target based on the redirector patterns and content of the data associated with the original connection-request, server 106 proceeds to further decode selected portions of the data to complete the authentication process. One piece of information that may be derived from the code word used to identify a legitimate connection-request referred above is locations of one or more usernames and/or one or more passwords. For example, as discussed above, the connection-request parameters pointed to by the decoded code word may include a pointer to a username-password location table that indicates possible locations of usernames and passwords, their possible locations and possible decryption algorithms to use.

Figure 3C:
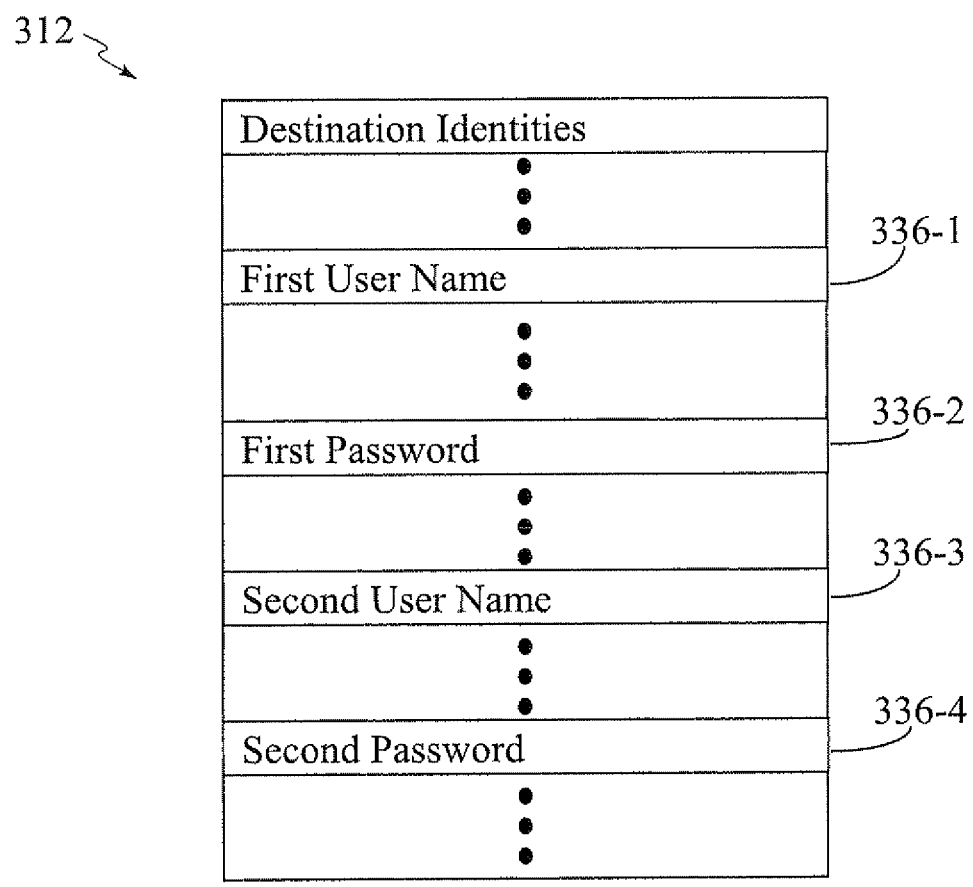
FIG. 3C shows an exemplary diagram of a data group that contains usernames and passwords.

FIG. 3A shows username(s) and password(s) 334, 336 and 338 are located in data groups 304, 312 and 318. As with code words, some of the usernames) and password(s) may be lost by network 102 such as username(s) and password(s) 338 when data group 318 is lost. As shown in the FIG. 3C example, at least two usernames and two passwords 336-1, 336-2, 336-3, and 336-4 are associated with data group 312. Server 106 locates and decrypts the usernames and passwords and determines whether the usernames and passwords are valid based on information related to the code word(s) 322, 324, 326 and 332, for example. Entities 104-124 may maintain a white list of usernames and passwords associated with valid code words. Thus, if the decrypted usernames and passwords are in the white list, then a first step of authentication is completed. If one or more of the usernames and/or passwords are not found to be valid, then the authentication failed and all data associated with the associated connection-request is appropriately disposed by either deleting them or saving them for intrusion analysis.

If the above first step of authentication is successful, server 106 may proceed to a second step and attempt to decrypt the remaining portions of the data for further identification information and detail substance of the connection-request. One of the randomizing parameters to be used for this second step is a timestamp. Client 104 may have used a timestamp at the time the connection-request was transmitted to randomize portions of data in the connection-request or "payload." For example, the timestamp rounded to a nearest preset boundary such as the nearest minute, quarter hour, or hour, for example, could have been used to select an encryption algorithm, or the rounded timestamp itself could have been used as a seed or key to encrypt the payload.

Server 106 does not know the rounded timestamp that was used by client 104 to encrypt the payload, but based on an estimate of network delay, server 106 can attempt to decrypt the data using a range of possible rounded timestamps. For example, if a quarter hour boundary was preset and network delay is estimated to be less than an hour, then server 106 may start with a timestamp that is an hour before the initial reception of the connection-request. Timestamps for every quarter hour can be used to perform decryption until a successful decryption is discovered or until the time that the connection-request is received is reached. A successful decryption may be determined if readable data is obtained and/or the readable data is consistent with other data already decrypted. If a successful decryption cannot be achieved, then the second step of authentication has failed. At this point, server 106 may decide either to stop further attempts to authenticate the connection-request and simply appropriately dispose of the data and wait for client 104 to attempt a connection again, or server 106 may transmit a synchronizing-timestamp to client 104.

The synchronizing-timestamp informs client 104 that server 106 failed to decrypt the payload of a prior connection-request and for client 104 to readjust its timestamp based on network delays that may be determined based on the synchronizing-timestamp. In response, client 104 may readjust its timestamp generator to generate a timestamp that better accounts for network delay. For example, client 104 may advance its timestamp generator clock by half an hour to account for perceived network delay so that another connection-request may arrive at server 106 within the allowed time range. Here, network delay also may include processing times incurred by redirectors 104-124.

The synchronizing-timestamp may be sent to one or more communication channels of client 104, or to communication channels of multiple entities 104-124. If intruders are monitoring server 106, then transmitting a synchronizing-timestamp only to client 104 may increase the intruders' insight into the authentication process. Along these lines, the synchronizing-timestamp may not include any information except for the timestamp so that even if intercepted, no other information may be lost to the intruders.

Returning to authentication in server 106, if decryption is successful, then server 106 completes the authentication process by authorizing a connection to client 104. Information may have been obtained from the payload for establishing a session. This information may be provided to a session manager, for example, to begin a process to establish a session with client 104.

The above described authentication process may be implemented in a very simple manner by simply using routers as redirectors. In this implementation, not all entities 104-124 are clients and/or servers. There are entities that are clients and/or servers such as entities 104 and 106, and there are entities that serve only as redirectors such as specialized-routers. Each of the specialized-routers includes tables such as found in associative memories that map between one or more input communication channel identifications and output destination communication channels identifications. For example, if Internet Protocol addresses are used (IP addresses), each router may have a range of input IP addresses that may be destinations for incoming data, and a range of output IP addresses to which data is transmitted. For each pattern of input IP address, a translation table may be used to obtain a set of one or more output IP addresses to which a modified connection-request may be sent. A received connection-request may be modified by appending the router's identification to a list of redirector identifications. Encryption may not even be used. In this way, a redirector pattern is recorded in each modified connection-requests that eventually arrive at server 106. The redirector patterns from all received modified connection-requests may be used to authenticate the original connection-request transmitted by client 104 and for other purposes as discussed above.

Figure 5:
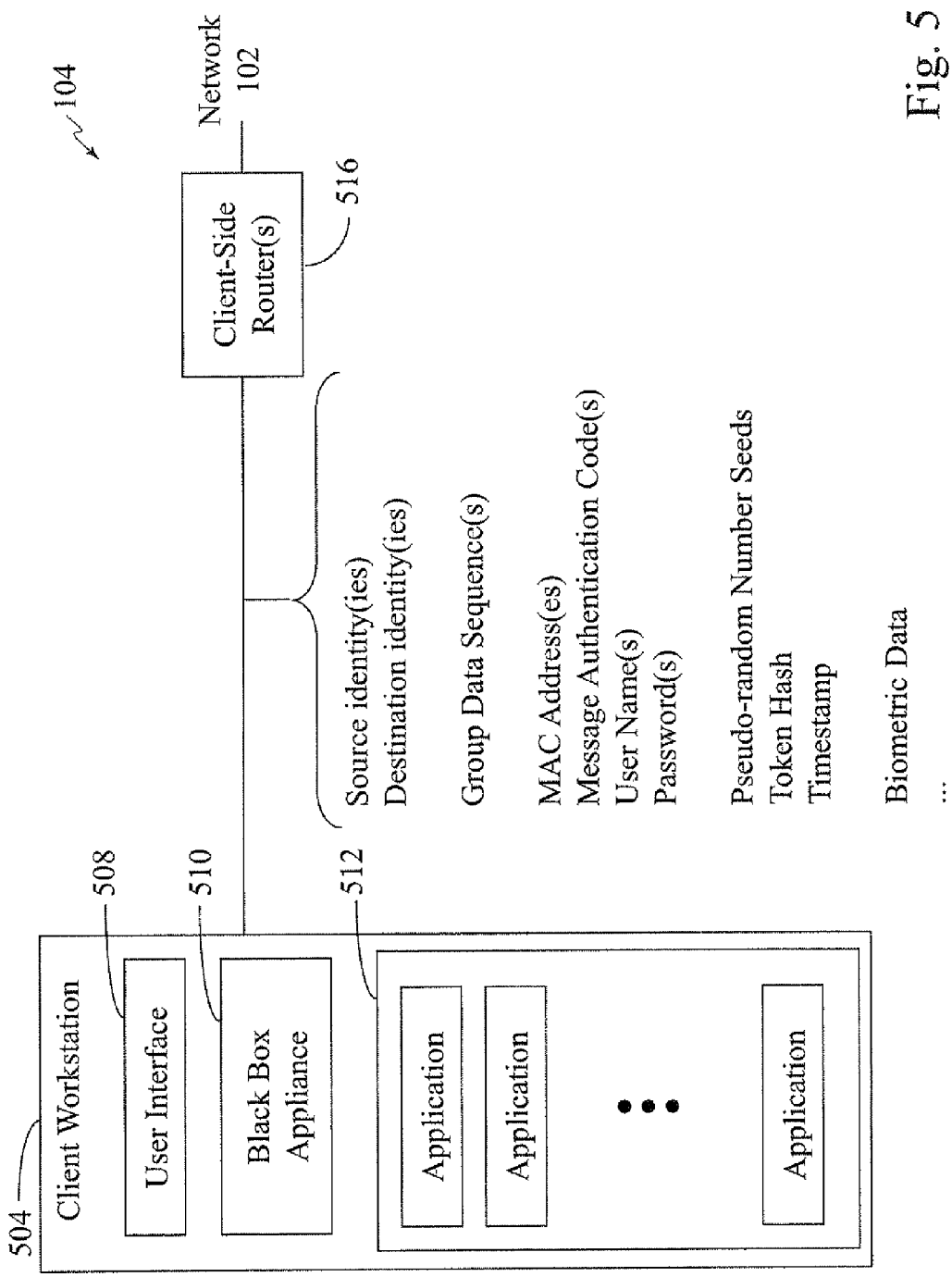
FIG. 5 shows an exemplary diagram of a client-side configuration.

FIG. 5 shows an exemplary diagram of client 104 as a workstation 504 and client-side router(s) 516. Client-workstation 504 includes a user interface 508 (e.g., keyboard, mouse, display, etc.), a black box appliance 510 that performs authentication tasks, and one or more applications 512. Client-side routers 516 interface with network 102 and provide one or more input communication channels to which network traffic can identify as destinations. When communication is received at the input communication channels, client-side routers 516 do not send any response such as acknowledgements so that the input communication channels appear dormant to prevent intruders from making possible discoveries.

Figure 6:
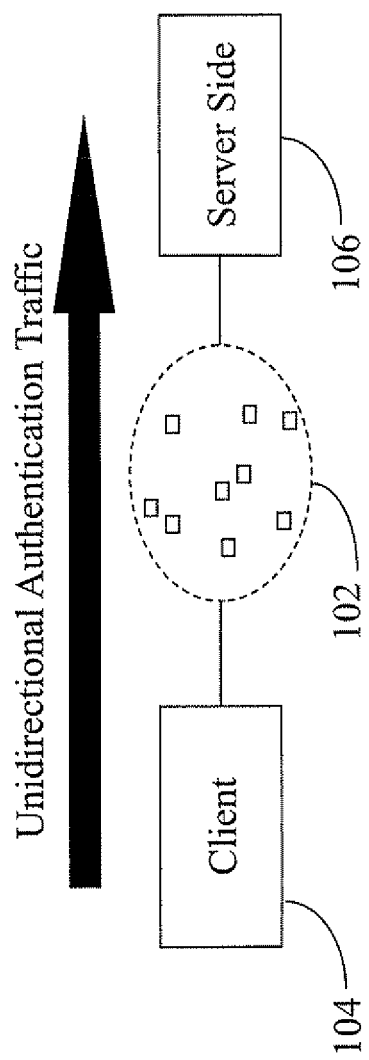
FIG. 6 shows an exemplary authentication traffic that is unidirectional between a client and a server.

FIG. 6 shows the effect of such dormant behavior at the input communication channels. The communication between client 104 and server 106 appears unidirectional during connection-request authentication. This is the result of a policy of no acknowledgement to reception of data related to connection-requests. The transmission of a synchronizing-timestamp is the only possible exception to this policy. However, the synchronizing-timestamp communication does not contain any identification of the source and may be transmitted through redirectors so that a connection between a transmission of a connection-request and the synchronizing-timestamp may be very remote if not impossible to detect.

Also shown in FIG. 5, client-workstation 504 may output a connection-request using information such as source identities, destination identities, group data sequences where data is transmitted to network 102 in groups and each group of data include a sequence number, message authentication code(s), MAC address(es), Username(s), password(s), pseudo-random number seed(s), token hash(es), timestamp(s) and/or biometric data, for example. Client-workstation 504 may select from this information to construct a connection-request that is substantially unique from other connection-requests generated by itself or other client-workstations. For example, client-workstation 504 may be assigned a set of source identities. For each connection-request, client-workstation 504 may select ones of the source identities based on a random number generated by a pseudo-random number generator. The random number may be used as a pointer into a table that lists combination of source identities that may be placed in a connection-request, for example.

Redirectors 104-124 and server 106 may be preloaded with appropriate information to replicate client-workstation 504 actions in this regard and thus be able to replicate what client-workstation 504 did to authenticate the connection-request. Similarly for other types of information in the above list, client-workstation 504 may select different ones of the various data based on pseudo-random numbers or token hashes to generate a unique connection-request that can be authenticated by other entities 104-124 of system 100.

Figure 7:
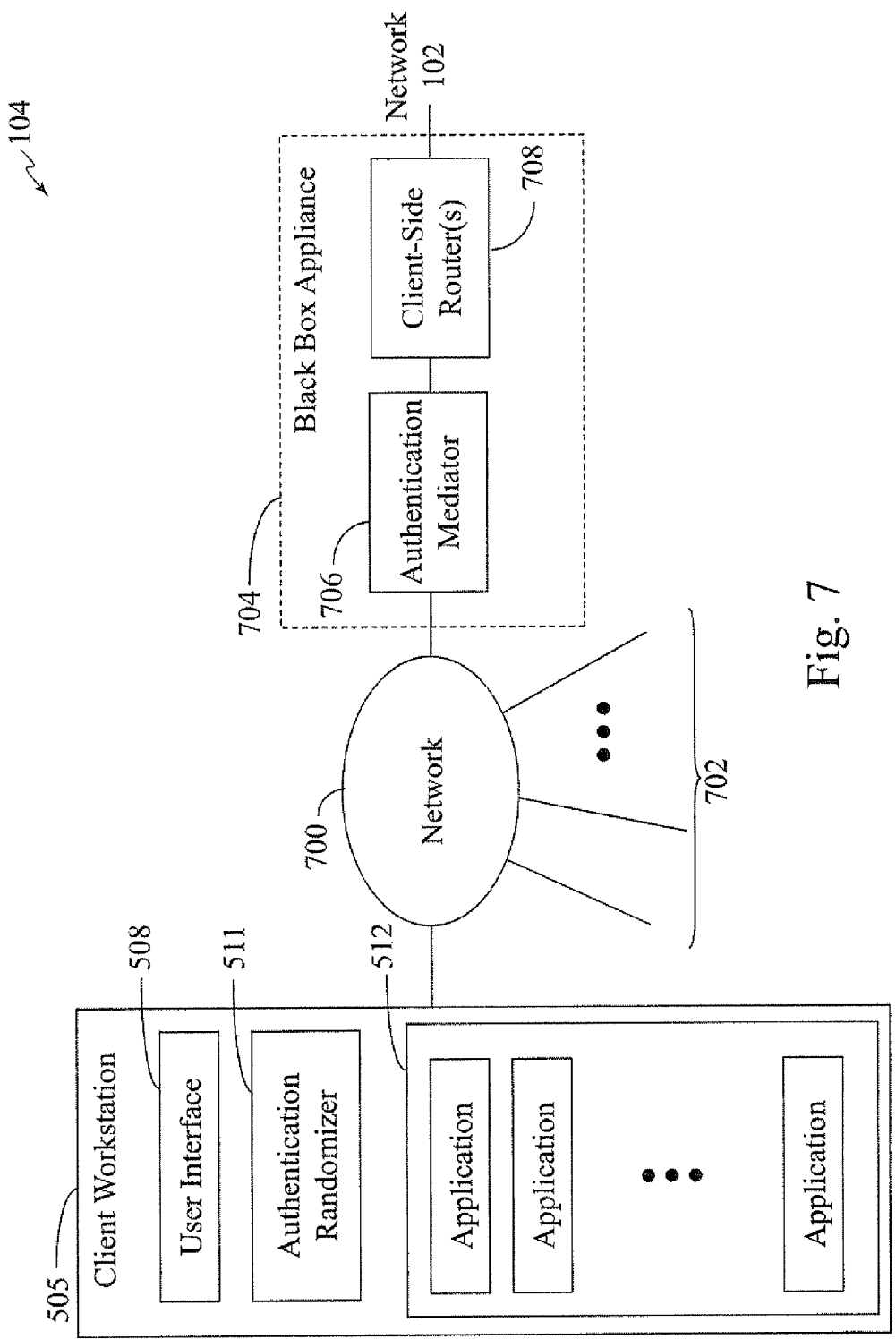
FIG. 7 shows a second exemplary client-side configuration.

FIG. 7 shows another exemplary configuration of client 104 where client-workstation 505 is connected to a black box appliance 704 through an intra-network 700. This may be a common configuration for a corporation having local intra-networks connecting perhaps hundreds of other employee workstations represent by lines 702. A public network such as the Internet may be used to obtain services provided by corporate or vendor servers. Thus, authentication of connection-requests is important to keep out possible intruders.

Instead of black box appliance 510, client-workstation 505 includes an authentication randomizer 511 so that identification data may be randomized in a way that is unique to client-workstation 505. Authentication randomizer 511 may include pseudo-random number generators with a set of seeds specific to client-workstation 505 and/or tokens and token hashing algorithms that are unique to client-workstation 505. Thus, client-workstation 505 may generate connection-request information that is unique each time that it requests a connection to a server. The connection-request information is transmitted to an authentication mediator 706 of black box appliance 704 through network 700.

Authentication Mediator 706 performs remaining tasks discussed above that are not performed by authentication randomizer 511 such as selecting redirectors, obtaining a timestamp, randomizing content of payloads of connection-requests based on randomizing parameters such as the timestamp, token hashes, pseudo-random numbers, etc. The division of tasks for generating a connection-request between authentication randomizer 511 and authentication mediator 706 may be adjusted based on implementation details, for example. Generated connection-requests are transmitted to network 102 via client-side router(s) 708. As discussed in connection with FIGS. 5 and 6, client-side routers 708 may not implement acknowledgement schemes to implement unidirectional authentication traffic as shown in FIG. 6.

Figure 8:
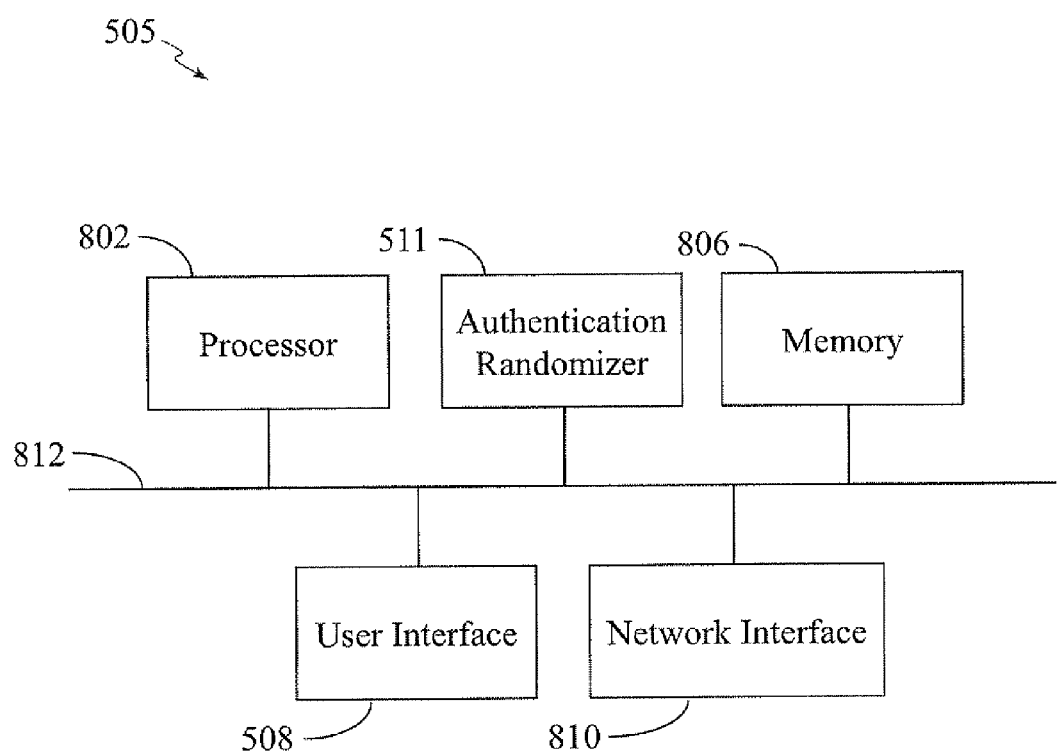
FIG. 8 shows a block diagram of an exemplary client-workstation.

FIG. 8 shows a block diagram of an exemplary client-workstation 505 that includes a processor 802, authentication randomizer 511, a memory 806, an user interface 508, and a network interface 810. All of these components are connected together through a bus 812. Although a bus-architecture is shown as an example, other component interconnections may be used as is well known. For example, a parallel connection between components may be used where high bandwidth may be required or where tight timing requirements are present. However, for low bandwidth and/or loose timing situations, serial connections may be used. Processor 802 and/or authentication randomizer 511 may be implemented using various technologies such as PLAs, PALs, applications specific integrated circuits (ASICs), off the shelf processors, and/or software executed in one or more general purpose or special purpose processors using one or more CPUs, for example. Memory 806 may be implemented using hard disk, optical disk, and/or RAM/ROM in either volatile or nonvolatile technologies.

When services from a server such as server 106 is desired, a user enters a user connection-request using user interface 508 and provides a username and password, for example. Processor 802 authenticates the username and password, identifies the user, and commands authentication randomizer 511 to process the username and password and other user and client-workstation information for server 106 authentication process. For example, authentication randomizer 511 may access memory 806 to retrieve all connection-request information related to server 106 and the identified user. Such information may include one or more seeds for randomization, one or more tokens, one or more MAC addresses for the client-workstation 505, one or more biometric data deposited by the user such as retina scans, fingerprints, facial features, voice prints, etc.

As noted above, authentication randomizer 511 may include hardware or software to generate pseudo-random numbers and token hashes. The user may have in possession a physical token such as an RSA secured ID, or a thumb drive containing user specific information or codes that can be plugged into client-workstation 505 to provide tokens to be used for that particular user. Alternatively, client-workstation 505 may have physical attachments that is specific to that client-workstation 505 that provides seeds or tokens to be used for authentication purposes. Such seeds and/or tokens are known to server 106 as well, so that server 106 can authenticate the connection-request originating from the user by replicating the randomization performed by client-workstation 505 on the user's behalf.

Although there are many ways that connection-request information may be generated, the following is an example of one way that client-workstation 505 may generate the connection-request information and transmit it to authentication mediator 706 for further processing. Authentication randomizer 511 may pseudo-randomly select seeds and a randomizing algorithm from connection-request-generation parameters stored in memory 806 that may include a table of seeds and algorithms specific to client-workstation 505. The same information may be stored in a memory of server 106. Authentication randomizer 511 may generate a pseudo-random number based on the selected seed and randomizing algorithm and use it as a pointer to a server 106-table in the connection-request-generation parameters that contains the information needed for generating the connection-request information for server 106, for example.

The server 106-table may include an instruction to generate three usernames and passwords. The username and password provided by the user may be used as token inputs of three different token-hashing algorithms pseudo-randomly selected to generate the three usernames and passwords. These usernames and passwords will be placed in the one or more connection-requests to be generated by authentication mediator 706.

As an example, the server 106-table may further include two MAC addresses and retina and finger-print biometric data, for example. The two MAC addresses may be hashed by the first and the third hashing algorithms, retina biometric data may be encrypted by a first encryption algorithm identified in the server 106-table, and finger-print biometric data may be encrypted by a second encryption algorithm also identified in the served 06-table. After performing all the required processing, Authentication randomizer 511 sends the results to processor 802. Processor 802 performs further processing that may be required for intra-network security and sends secured connection-request information to network interface 810 for transmission to authentication mediator 706.

After the connection-request information is transmitted, processor 802 may set a timer as a maximum waiting time for the requested connection to be made. If the timer expires before the connection to server 106 is completed, processor 802 may decide to try again for a preset number of times. If all tries failed to establish a connection to server 106, processor 802 may send a message to the user that the requested connection failed.

Figure 9:
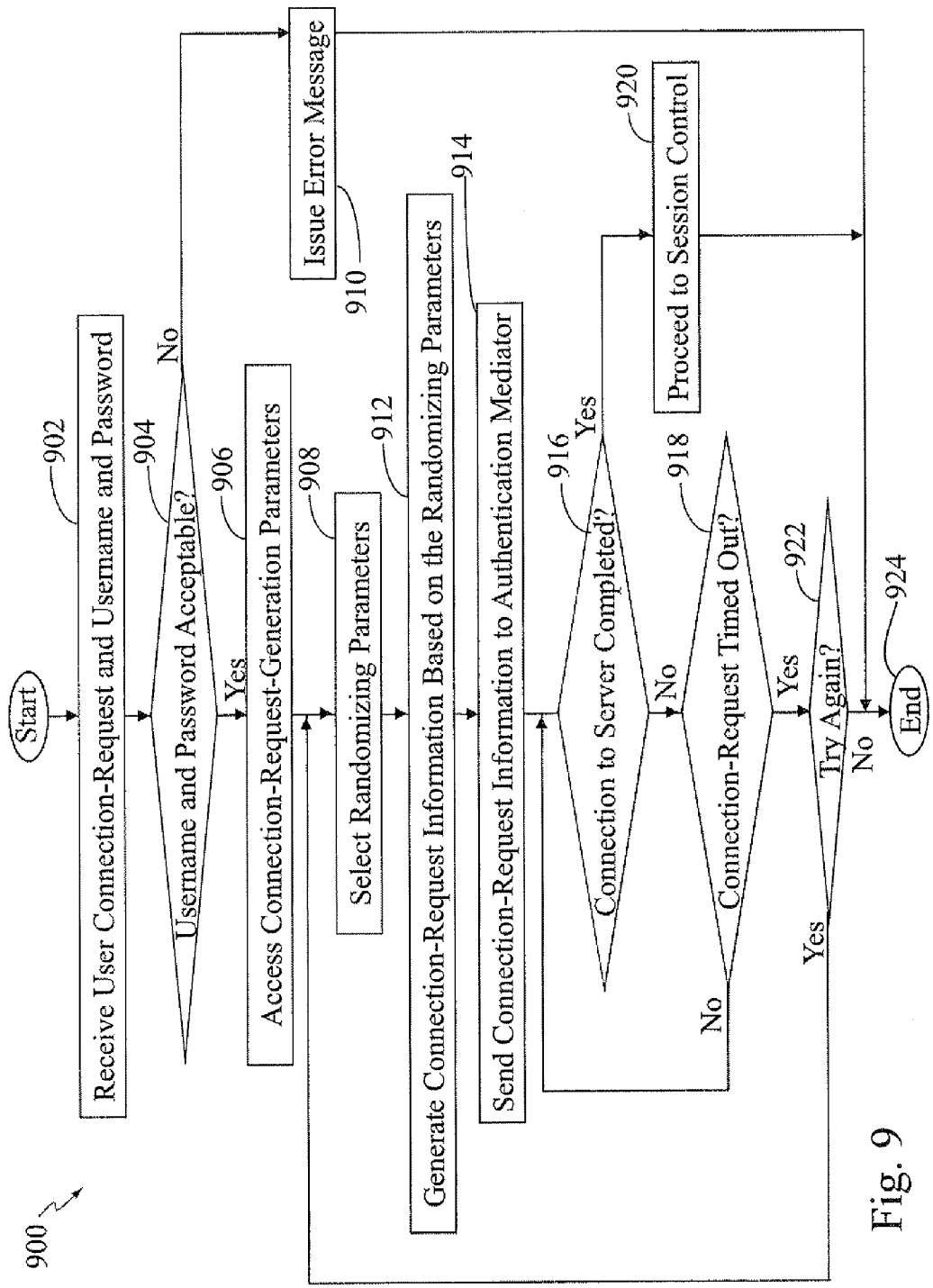
FIG. 9 shows an exemplary flow chart of a client-workstation.

FIG. 9 shows a flow chart 900 of an exemplary process for a client-workstation that is configure as shown in FIG. 7. In step 902, a user connection-request and username and password are received and the process goes to step 904. In step 904, the process determines whether the username and password are acceptable. If acceptable, the process identifies the user and goes to step 906. If the username and password are not acceptable, the process goes to step 910, issues an error message to the user and goes to step 924 and ends. In step 906, the process accesses connection-request-generation parameters stored in a memory of the client-workstation, and goes to step 908.

In step 908, the process pseudo-randomly selects server-table specific to the server identified by the user and goes to step 912. In step 912, the process generates connection-request information based on information in the server-table that includes randomizing parameters and information associated with the user identity and goes to step 914. For example, the user identity may be used to make selections of one or more MAC addresses, biometric data deposited by the user, etc. In step 914, the process sends the generated connection-request information to an authentication mediator and the process goes to step 916.

In step 916, the process determines if the requested connection is completed. If the connection is completed, the process goes to step 920 which hands control over to a session control process and goes to step 924 and ends. If the requested connection is not completed, the process goes to step 918. In step 918, the process determines whether the connection-request has timed out. For example, the process may set a maximum time to wait for the requested connection to be completed. If this maximum time has expired, then the connection-request times out, and the process goes to step 922. In step 922, the process determines whether to try to make a connection again. A number of tries may be set to account for network abnormalities, for example. If the number of tries has not expired, then the process returns to step 908. If the number of tries has been exceeded, then the process goes to step 924 and ends.

Figure 10:
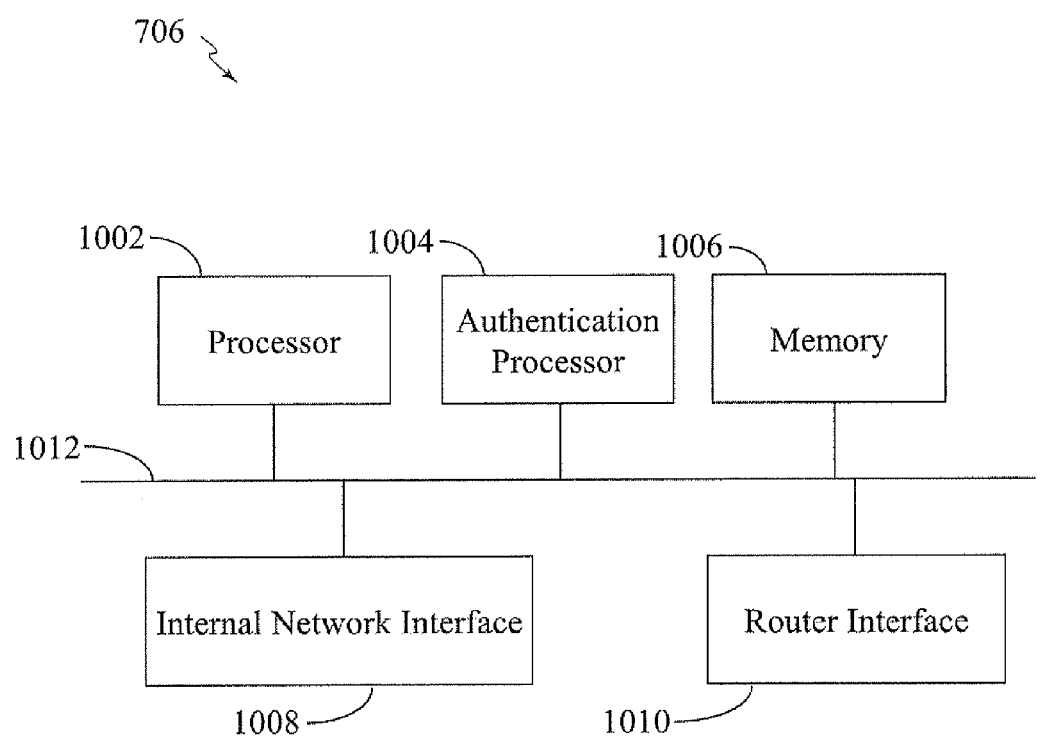
FIG. 10 shows a block diagram of an exemplary authentication mediator.

FIG. 10 shows a block diagram of an exemplary authentication mediator 706 that includes a processor 1002, an authentication processor 1004 which may include a timestamp generator, a memory 1006, an internal network interface 1008 and a router interface 1010. All of these components are connected together by a bus 1012. Similar to what was discussed in connection to client-workstation 505, although a bus-architecture is shown as an example, other component interconnections may be used, as is well known. A parallel connection between components may be used where high bandwidth may be required or where tight timing requirements are present, but, for low bandwidth and/or loose timing situations, serial connections may be used, for example. Processor 1002 and/or authentication processor 1004 may be implemented using various technologies such as PLAs, PALs, applications specific integrated circuits (ASICs), off the shelf processors, and/or software executed in one or more general purpose or special purpose processors using one or more CPUs, for example. Memory 1006 may be implemented using hard disk, optical disk, and/or RAM/ROM in either volatile or nonvolatile technologies.

When a connection-request information is received from internal network interface 1008, processor 1002 may perform authentication appropriate for internal network 700. If authentication is successful, processor 1002 commands authentication processor 1004 to prepare one or more connection-requests based on a randomization process.

Authentication processor 1004 may pseudo-randomly select from memory 1006 first randomizing parameters from sets of first randomizing parameters prepared for server 106 as the ultimate target. Sets of first randomizing parameters may be prepared for each entity 104-124 that may be a server with respect to authentication mediator 706. The first randomizing-parameters may include a list of entities 104-124 that may be designated as redirectors, and pseudo-random number seeds that may be included in the connection-requests so that server 106 may make the same pseudo-random selections that are made by authentication processor 1004. Alternatively, server 106 may already have the needed pseudo-random number seeds stored in its memory to replicate authentication processor 1004 actions. Authentication processor 1004 proceeds to generate a connection-request for each of the identified entities.

For each identified entity, authentication processor 1004 may generate a pseudo-random number that may be used as a pointer to pseudo-randomly select second randomizing parameters. The second randomizing parameters may include lists of destination identifications, pseudo-random number seeds, tokens and token-hashing algorithm identifications, locations at which one or more code words, one or more usernames, and one or more passwords could be placed, a number of biometric data and MAC addresses to be used, etc. Although client-workstation 505 may have generated the biometric data and MAC addresses, authentication processor 1004 may select which ones of the provided biometric data and MAC address(es) that will be incorporated in a connection-request. Authentication processor 1004 may also select from an accessible list of biometric data and/or MAC addresses to be used for generating the connection-request together with the provided biometric data and MAC addresses, or instead of the provided information. After all the data for a payload of a connection-request is generated and/or collected, authentication processor 1004 obtains a timestamp from the timestamp generator of authentication processor 1004. Authentication processor 1004 may select an encryption algorithm based on the timestamp to encrypt the payload data and place the encrypted data in the connection-request. For example, the timestamp may be hashed by a hashing algorithm into a pointer that points to an encryption algorithm among a list of encryption algorithms. The encryption may be performed in a piecemeal manner so that other data such as code words, usernames, and passwords may be interspersed among portions of the encrypted payload data.

As discussed above, the connection request may be transmitted in data groups, each data group may be assigned a sequence number, and the data groups are put in an intended order based on information in the first randomizing parameters, for example. At this point, authentication processor 1004 may calculate a number of data groups that will be required to transmit the generated connection-request. A set of sequence numbers may be generated and assigned to the data groups for one of a set of intended orders of the data groups. The sequence number may not necessarily be consecutive, and need not start or end in any particular manner.

A correspondence may be established between each intended order and one or more of redirector patterns. Redirector patterns may have a degree of variation because each redirector may pseudo-randomly select a next entity 104-124 to send a modified connection-request. However, the degree of variation of redirector patterns may be controlled by coordinating all possible selections so that groups of redirector patterns may correspond to an intended data group order. The redirector patterns and the intended order of the data groups may be selected, and encrypted to be included in the connection-request. Alternatively, server 106 may have such a correspondence stored in its memory.

After encrypting the payload, authentication processor 1004 may pseudo-randomly select and encrypt usernames and passwords and place them in their proper locations interspersed among the payload. Then, authentication processor 1004 may pseudo-randomly select a number of code words, and encrypt the selected code words using a pseudo-randomly selected token-hashing algorithm. At this point, all encryption tasks are completed and the connection-request is generated except for the unencrypted portion that is required for network 102 to deliver the connection-request such as the destination identity(ies).

As noted earlier, each redirector/server have designated input communication channels to receive communications. Authentication processor 1004 may select from the second randomizing parameters one or more destination identities, and place them in the appropriate locations as required for traffic in network 102. Destination identities may be pseudo-randomly selected. In this way, even though destination are not encrypted, their relationship to a specific connection-request are masked by the randomization so that a pattern of destination identities serve as part of an authentication scheme.

After a connection-request is generated for an identified entity either a redirector or server, the connection-request is sent to router interface 1010 for transmission to the identified entity through network 102, and processor 1002 waits to receive either a synchronizing-timestamp or an indication that the requested connection has been authorized. If a synchronizing-timestamp is received, processor 1002 readjusts the timestamp generator to account for any delays implied by the synchronizing-timestamp and generate a different connection-request for the identified entity.

If the requested connection is authorized, processor 1002 may inform client-workstation 505 and proceed to hand control to a session controller for establishing a session with server 106. If nothing is received from the identified entity after a set wait time, processor 1002 may generate a second connection-request that is different from the first connection-request, and transmit the second connection-request to the identified entity. If after a set number of tries, the desired connection to server 106 is still not made, then processor 1002 may inform client-workstation 505 that the connection-request failed.

Figure 11:
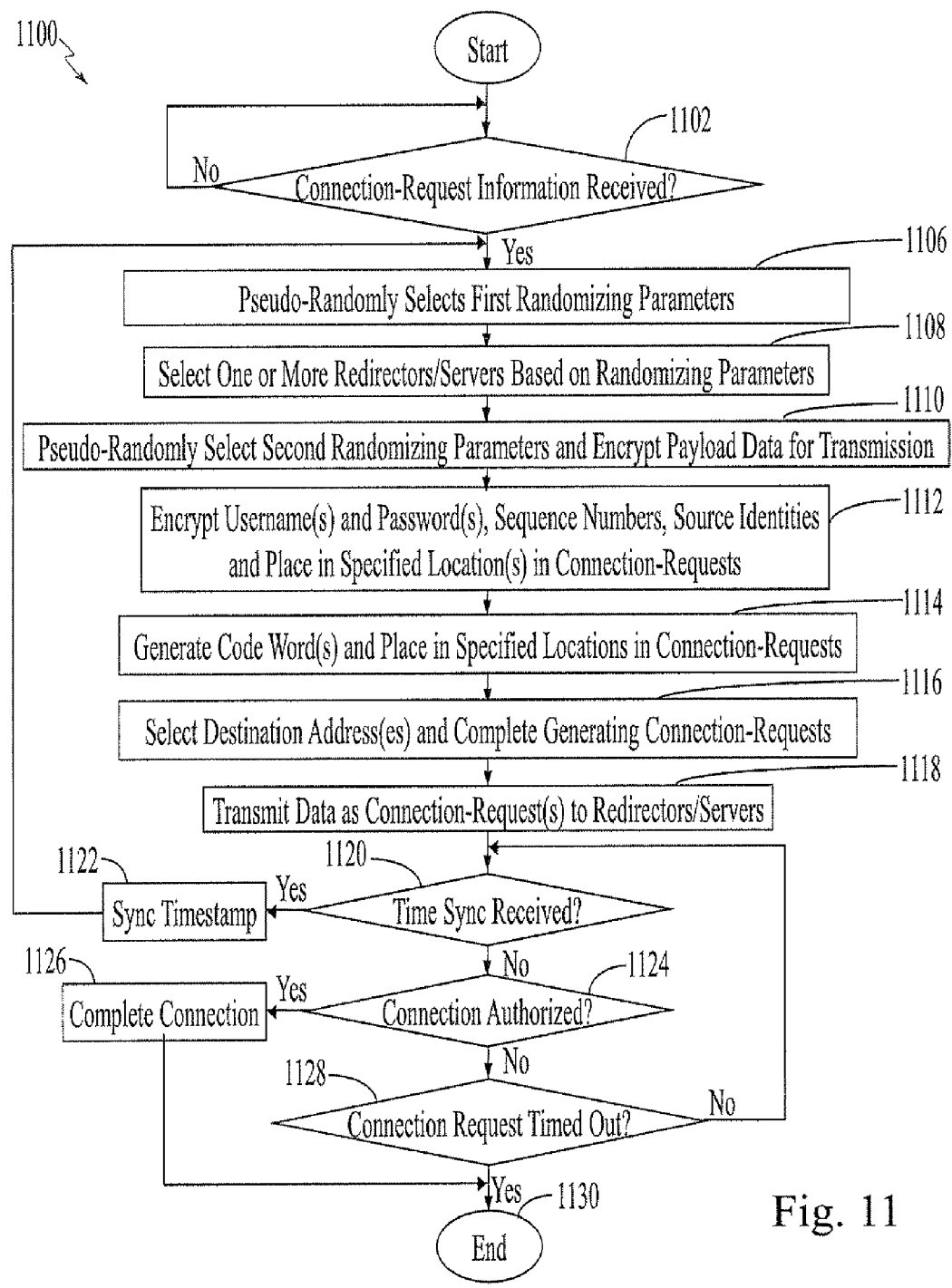
FIG. 11 shows an exemplary flow chart of the authentication mediator.

FIG. 11 shows a flow chart 1100 of an exemplary process that may be performed by authentication mediator 706. In step 1102, the process checks whether connection-request information has been received. If connection-request information has been received, the process goes to step 1106; otherwise, the process returns to step 1102. In step 1106, the process pseudo-randomly selects first randomizing parameters and goes to step 1108. As discussed above, memory 1006 may have sets of first randomizing parameters associated with every entity 104-124 that can be a server with respect to authentication mediator 706. One of the set of first randomizing parameters may be pseudo-randomly selected that corresponds to the entity that is identified in the connection-request information as the ultimate target, such as server 106, for example.

In step 1108, the process may select one or more redirectors/servers found in the first randomizing parameters, and goes to step 1110. The first randomizing parameters may include many lists of redirectors/servers groups that can be selected as destinations for connection-requests. One of the lists may be pseudo-randomly selected using a pseudo-random number or a hashed token received in the connection-request information that can be converted to a pointer to one to the lists. As discussed above, the original connection-request is propagated as modified connection-requests through network 102 as directed by the lists of redirectors/servers selected by each entity in network 102 that is visited. In this way, patterns of redirectors/servers are formed that encodes authentication information and instruction information that can be extracted at each redirector/server for authentication purposes and for instructions to select a next step to execute.

In step 1110, for each redirector/server, the process pseudo-randomly selects second randomizing parameters. The second randomizing parameters may include a number of MAC addresses, a number of biometric data, one or more tokens and token-hashing algorithm identifications, pseudo-random seeds, locations at which one or more usernames, one or more passwords could be placed, etc., and the process goes to step 1112. The process pseudo-randomly collects data from the second randomizing parameters as payload data. Some of the data included as payload data may be used for further authentication and/or provides information for generating pseudo-random numbers for determining contents of modified connection-requests. The process encrypts the payload data using an encryption algorithm that may be pseudo-randomly selected from a list in the second randomizing parameters based on a timestamp of the timestamp generator. In step 1112, for each redirector/server, the process pseudo-randomly selects usernames and passwords provided in the connection-request information and/or from the second randomizing parameters. The selected usernames and passwords are encrypted and intersperse among the encrypted payload data at locations specified in the second randomizing parameters. Additionally, the process generates sequence numbers for each of data groups that are needed to transmit the connection-request and pseudo-randomly selects an order of the data groups that corresponds to a set of redirector patterns.

The sequence numbers may be encrypted and included in the connection-request, and the process goes to step 1114. As earlier discussed, one or more usernames and passwords define a first authentication. This information is placed in locations that can be determined by server 106 based on information in randomizing parameters stored at server 106.

In step 1114, for each redirector/server, the process may pseudo-randomly generate one or more code words and place them at specific locations in the connection-request, and the process goes to step 1116. The code words may be tokens provided in the connection-request information and hashed by a pseudo-randomly selected hashing algorithm. In step 1116, the process pseudo-randomly selects one or more destination identifications and place these identifications in the connection-requests as required by network 102 to complete generating the connection-requests, and the process goes to step 1118. In step 1118, the process transmits the generated connection-requests, and goes to step 1120. Each of the connection-requests is transmitted to destination identifications of a single redirector/server. The connection-requests are different from each other because each connection-request is uniquely generated based on information specific for a particular redirector/server.

In step 1120, the process waits for a synchronizing-timestamp. If a synchronizing-timestamp is received, the process goes to step 1122. Otherwise, if a synchronizing-timestamp is not received, the process goes to step 1124. In step 1122, the process readjusts the timestamp generator based on the received synchronizing-timestamp and returns to step 1106. In step 1124, the process checks if an indication that the requested connection has been authorized. If the requested connection has been authorized, the process goes to step 1126 and completes the connection process by handing control to a session manager, for example, and goes to step 1130 and ends. If the connection has not been authorized, the process goes to step 1128. In step 1128, the process checks if a maximum time to establish the connection to server 106 has expired. If the maximum time has expired, then the process may send a connection failure message to client-workstation 505, goes to step 1130 and ends. If the maximum time has not expired, the process returns to steps 1120.

The above description relates to the embodiment of client 104 shown in FIG. 7. For client 104 shown in FIG. 5, the functions of authentication randomizer 511 and authentication mediator 706 are combined with any redundancies removed. Thus, all the function discussed above in connection to transmitting connection-requests in response to a user request for a connection are performed also in black box appliance 510 for client workstation 504.

Figure 12:
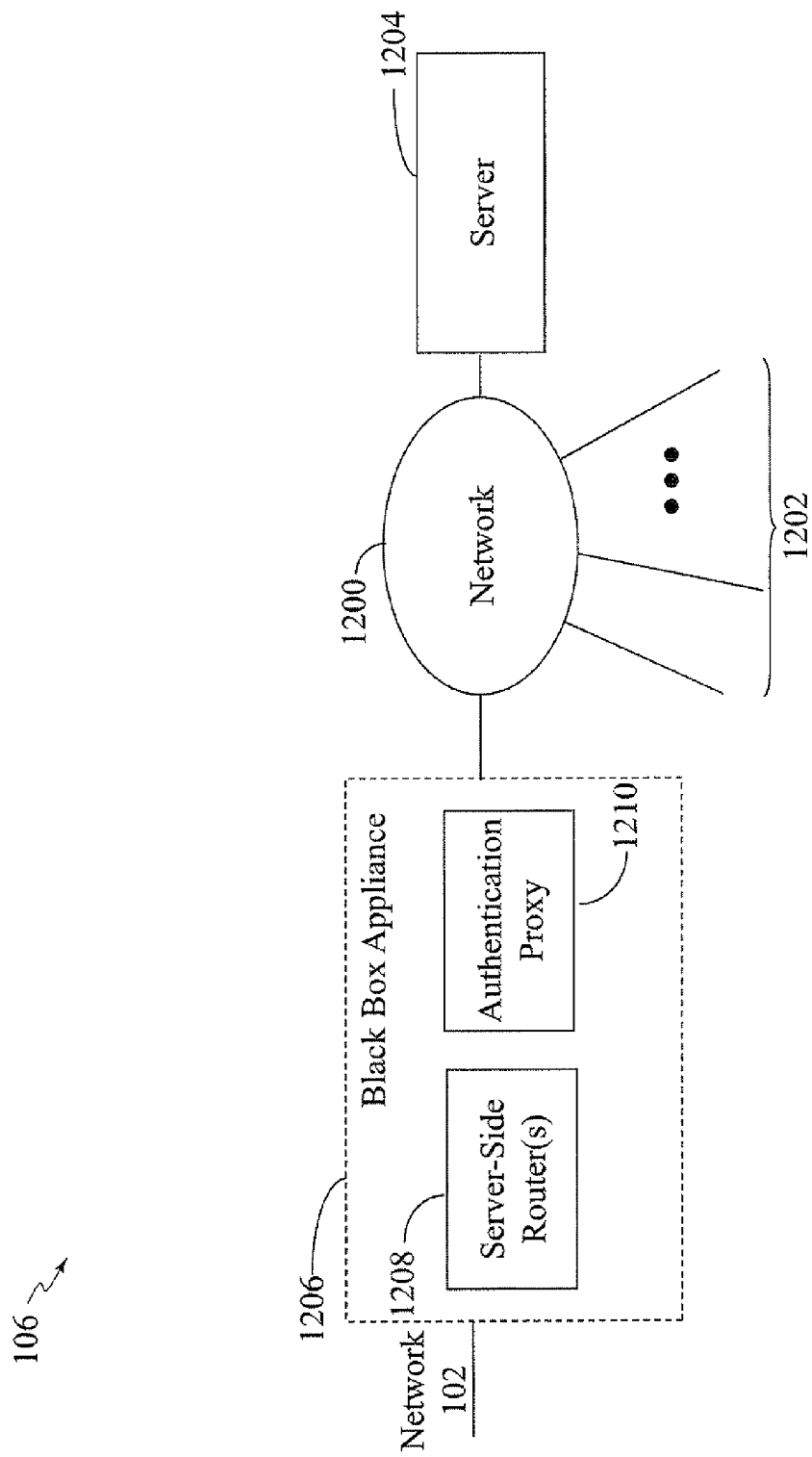
FIG. 12 shows an exemplary diagram of a server-side configuration.

FIG. 12 shows an exemplary diagram of redirector/server 106. The term redirector/server is used because for any connection-request that is received, a redirector/server does not know ahead of time which role it is required to play until sufficient portions of the received connection-request is decrypted. However, for convenience, the term "server" will be used instead of redirector/server in the following discussion. Like client-workstation 104, server 106 may be implemented by a single unit that includes a processor, memory, network interface, etc. as is well known. However, FIG. 12 shows a server 1204 connected to a black box appliance 1206 through an intra-network 1200 that may have other servers or client-workstation connections 1202, for example. Black box appliance 1206 communicates with network 102 and includes one or more server-side routers 1208 and an authentication proxy 1210 that perform authentication functions. In one embodiment, server 1204 is connected to client 104 only after authentication proxy 1210 have authenticated one or more connection-requests that originated from client 104.

Black box appliance 1206 could be incorporated in server 1204 and intra-network 1200 eliminated. This would result in a configuration similar to that of client-workstation 504 shown in FIG. 5. However, for the following discussion, the configuration shown in FIG. 12 is used.

Server-side routers 1208 may be assigned designated input communication channels that have destination identifications from which connection-requests are received. As discussed above, server-side routers 1208 do not respond to any communication in connection with connection-requests, but take a passive posture as viewed externally. However, all data received from the designated input communication channels are saved and analyzed by authentication proxy 1210 to determine if a legitimate connection-request is present. If a legitimate connection-request is found, then authentication proxy 1210 further processes the connection-request to determine whether, as a redirector, to generate one or more modified connection-request(s) or, as a server, to authorize the requested connection.

Figure 13:
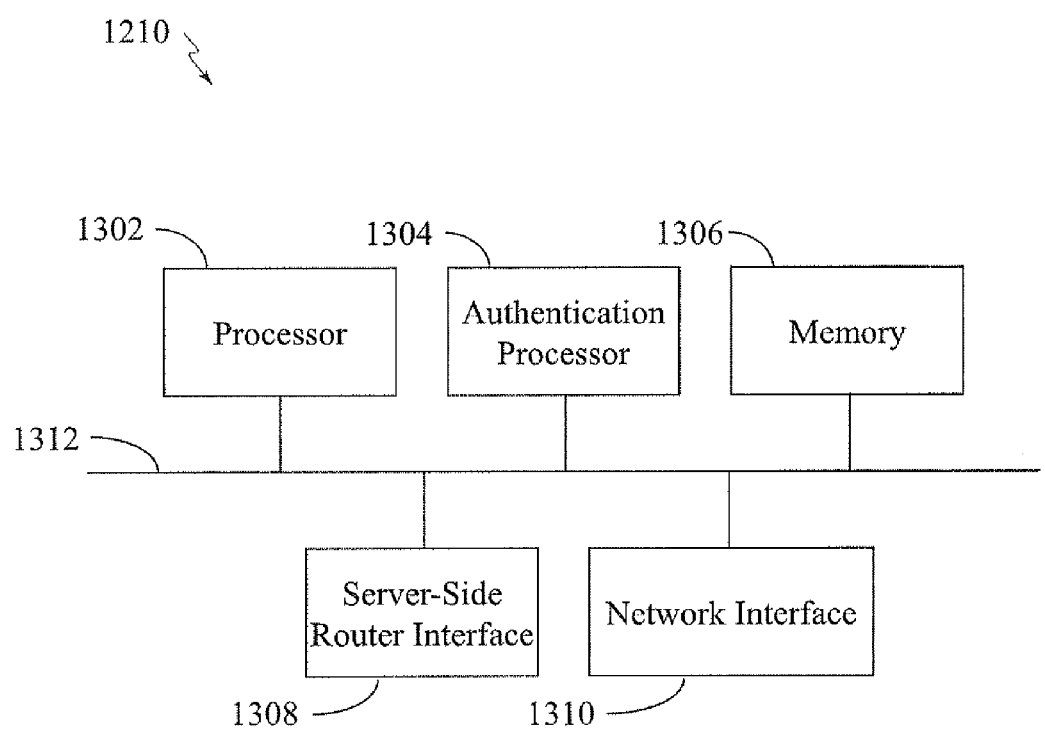
FIG. 13 shows a diagram of an exemplary authentication proxy.

FIG. 13 shows a block diagram of an exemplary authentication proxy 1210 that may include a processor 1302, an authentication processor 1304, a memory 1306, a server-side router interface 1308 and a network interface 1310. All these components are connected by a bus 1312. As noted above in connection with authentication mediator 706, although a bus-architecture is shown as an example, other component interconnections may be used, as is well known. A parallel connection between components may be used where high bandwidth may be required or where tight timing requirements are present, but, for low bandwidth and/or loose timing situations, serial connections may be used, for example. Processor 1302 and/or authentication processor 1304 may be implemented using various technologies such as PLAs, PALs, applications specific integrated circuits (ASICs), off the shelf processors, and/or software executed in one or more general purpose or special purpose processors using one or more CPUs, for example. Memory 1306 may be implemented using hard disk, optical disk, and/or RAM/ROM in either volatile or nonvolatile technologies.

Server-side routers 1208 maintain in an open state all the designated communication channels and receives data having these channels as destination identities. As discussed above in connection with FIG. 3A, data may be transmitted in groups. After each data group is received, processor 1302 commands authentication processor 1304 to search for a possible code word in the data group. As discussed earlier, there may be multiple code words that are interspersed with payload data, but at specific locations based on a pseudo-random process that can be replicated by server 106. Additionally, a code word may be hashed by a selected hashing algorithm from one or more hashing algorithms. Because processor 1302 cannot predict which of the received data groups may contain a code word, every data group is scanned for code words at locations in the code-word-location table until a code word is found.

A process similar to that shown in FIG. 4 is performed to locate and de-hash the corresponding token. Once obtained, the token is then used to locate connection-request parameters that contain all the information relating to the received connection-request including a number of data groups in the connection-request and randomizing parameters, for example. The connection-request parameters may contain information that is needed to decrypt and/or de-hash information required to obtain data and instructions for further processing the connection-request.

The connection-request parameters may include one or more pointers to locations in memory 1306 that contain different possible redirector patterns that can be associated with the connection-request, for example. As discussed earlier, a redirector pattern recorded in the connection-request may encode information and/or instructions. If the redirector pattern in the connection-request is not found in memory 1306 at the locations indicated by the pointers or other code words does not confirm the redirector pattern, then the connection-request is appropriately disposed by either deleting the data groups or saving them for intruder analysis.

If the redirector pattern is found, the connection-request parameters may include redirector-pattern-information associated with the redirector pattern that indicates the next process to execute. The redirector-pattern-information may identify all data groups that are part of this connection-request having this particular redirector pattern. This information may also have been placed in the connection-request and can be decrypted by a pseudo-randomly selected decryption algorithm. Based on this information, processor 1302 may search for all other data groups among the received data in memory 1306. If all needed data groups are found, processor 1302 may collect the data groups together as shown in FIG. 3A and instruct authentication processor 1304 to fully decipher all the information required to proceed with the instructed next process. For example, processor 1302 may be instructed to send modified connection-requests to a list of redirectors/servers, stop any further processing, or begin authentication processes as a server.

For example, if the redirector pattern indicates that authentication proxy 1210 is actually a redirector, then authentication processor 1304 may identify seeds either in the connection-request or in the redirector-pattern-information for making various selections in a pseudo-random manner. For example, authentication processor 1304 may select one list of redirectors/server from a group of lists identified in the redirector-pattern-information. Authentication processor 1304 may generate a modified connection-request for each of the redirectors/servers in the list by modifying the received connection-request by at least adding an encrypted self-identification to the list of redirectors. The modified connection-request is transmitted to network 102 through network interface 1310.

If the redirector pattern indicates that entity 106 is server 106, then authentication processor 1304 may proceed to locate and decrypt one or more usernames and one or more passwords for the first authentication step. As with the code words, authentication processor 1304 may search through possible locations in the connection-request parameters and using one of several possible encryption algorithms to locate and decrypt possible usernames and passwords, for example. The locations of the username(s) and password(s) may also be placed in the connection-request based on a pseudo-random process using one of a list of seeds. If the connection-request parameters indicate that this is the selected method, then authentication processor 1304 will proceed accordingly. If decrypted username(s) and password(s) are not found in a white list, then the connection-request is appropriately disposed by deletion or saving for intruder analysis. If decrypted usernames) and password(s) are found in the white list, then the first step of authentication is successful.

Once the one or more usernames and one or more passwords are found, the payload data may be decrypted by one of several decryption algorithms found in the connection-request parameters, for example. In one embodiment, an estimated timestamp is generated that approximates the time when the original connection-request was generated. As noted earlier, the timestamp is rounded to a preset increment such as a nearest hour, quarter, minute, etc. A decryption algorithm may be selected based on the timestamp to decrypt the payload data. For example, the timestamp may be hashed into a pointer using a pseudo-randomly selected hashing algorithm. The pointer points to an encryption algorithm that decrypts the payload data. Other schemes may be used to decrypt the payload data such as combining the timestamp with a pseudo-randomly selected username or password and the result hashed by pseudo-randomly selected hashing algorithm to obtain the pointer to the encryption algorithm to decrypt the payload data, for example.

If attempts to decrypt the payload data is unsuccessful (no readable data), then authentication processor 1304 may generate and transmit a synchronizing-timestamp toward the presumed source. Source identities in the connection-request may be used as destination identities. Alternatively, the destination identities may be obtained from the connection-request parameters. A further alternative could be to broadcast or multicast the synchronizing-timestamp to entities 104-124 of system 100 using a source or destination identity pattern to identify the presumed source of the original connection-request. After transmitting the synchronizing-timestamp, data associated with the connection-request may be appropriately disposed by deletion or save for future intruder analysis.

Once decrypted, the payload data may include further confirmation of authenticity such as encrypted one or more MAC addresses, one or more biometric data, etc.

If any of these do not conform to expected values, then the requested connection is not authorized and the data associated to the connection-request is appropriately disposed by deletion or saved for intruder analysis. If authentication data is confirmed for the connection-request, then authentication processor 1304 determines if authentication data is confirmed for other received connection-requests. If authentication data from all received connection-requests are confirmed, then the requested connection is authorized and control is handed over to a session manager to set up the requested session.

Figure 14:
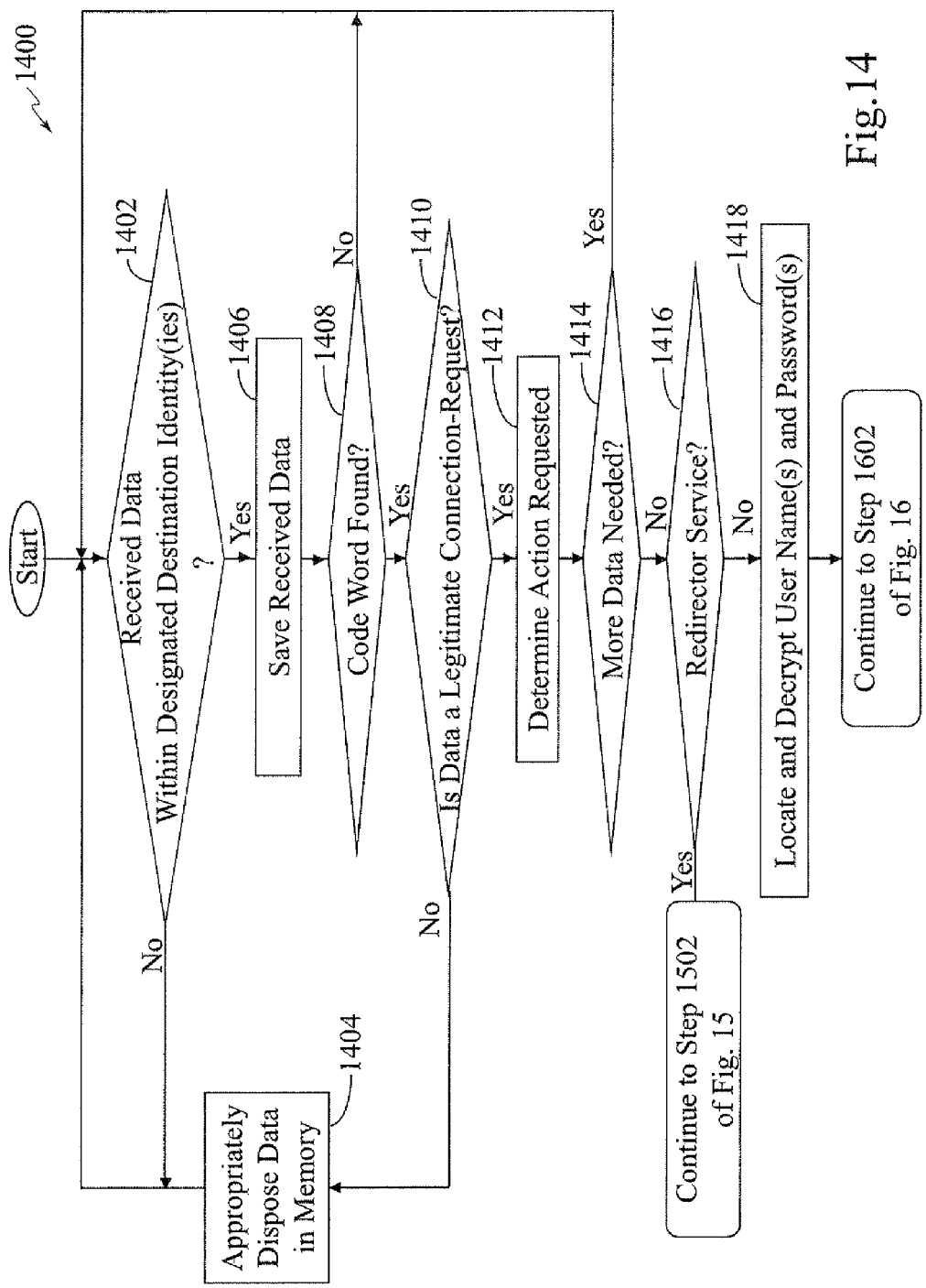
FIG. 14 shows an exemplary flow chart for determining whether received data is a legitimate connection-request.

FIG. 14 shows a flow chart 1400 of an exemplary process of authentication proxy 1210. In step 1402, the process checks if data is received from network 102 through designated communication channels having designated destination identities that are identified in the data. If data is received, the process goes to step 1406. If no data is received, the process returns to step 1402. In step 1406, the process saves the received data and goes to step 1408. In step 1408, the process searches for a code word in the received data. As note above, data may be received in data groups, and each data group may contain one or more code words at specific locations. The process may search each data group as they are received through all possible locations of the code-word-location table where the code words may be found and attempt to decrypt each possible code word. As discussed above, a token corresponding to the code word may be obtained by selecting a possible token and a possible hashing algorithm and trying each combination until a token is identified. If no token is identified, then no code word is found. If a valid code word is found, the process goes to step 1410. If a code word is not found, the process returns to steps 1402.

In step 1410, the process locates connection-request parameters based on the a token that corresponds to the code word. The connection-request parameters may include information that indicates where encrypted redirector patterns are located in the connection-request and how to decrypt the encrypted redirector pattern. Using this information, the process extracts the redirector pattern from the connection-request and searches for the redirector pattern based on the information in the connection-request parameters. For example, connection-request parameters may include a list of redirector patterns or point to such a list in memory 1306. If the redirector pattern is found, then the connection-request is determined to be legitimate and the process goes to step 1412. If a redirector pattern is not found, then the connection-request is not legitimate and the process goes to step 1404. In step 1404, the data save in memory 1306 that is associated with the connection-request is appropriately disposed by deletion or moved into an intruder analysis file, and the process goes to step 1402.

In step 1412, the process identifies redirector-pattern-information that may be located in the connection-request parameters or located in memory 1306 and pointed to by the information in the connection-request parameters, for example. In any case, the process determines, how many data groups are needed, how to order the data groups, and what is the next processing step based on the redirector-pattern-information, and goes to step 1414. In step 1414, the process determines if all the required data groups have been received. If all the data groups have not been received, the process returns to step 1402. If all the required data groups have been received, then the process goes to step 1416. In step 1416, the process determines whether the redirector-pattern-information indicates that further redirection is required. If further redirection is required, the process goes to step 1502 of FIG. 15. If the redirector-pattern-information indicates that server processes should be initiated and authentication of the connection-request should proceed, the process goes to step 1418. In step 1418, the process locates and decrypts one or more usernames and one or more passwords, and goes to step 1602 of FIG. 16. As discussed above, the usernames and passwords may be pseudo-randomly interspersed with payload data. Thus, the process may obtain a table of possible locations of the usernames and passwords and possible decryption algorithms based on the redirector-pattern-information and attempt to decrypt data from all possible locations to obtain the usernames and passwords.

Figure 15:
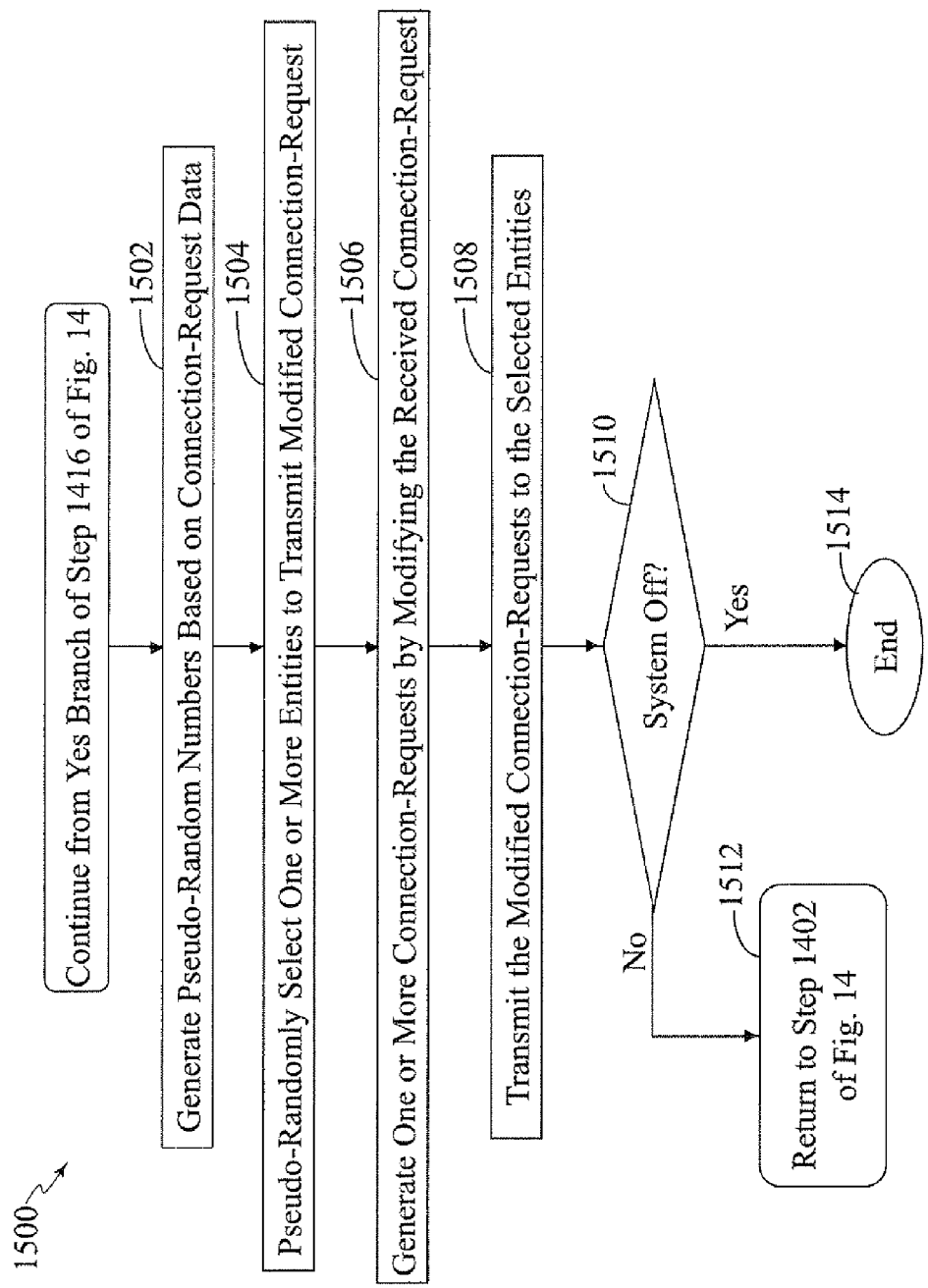
FIG. 15 shows an exemplary flow chart portion for a redirector.

FIG. 15 shows a flow chart 1500 of an exemplary process for a redirector. In step 1502, the process generates pseudo-random numbers based on data in the connection-request parameters, and the process goes to step 1504. In step 1504, the process pseudo-randomly selects a set of entities 104-124 to send a modified connection-request, and the process goes to step 1506. For example, multiple lists of entity identifications may be stored in a table. The pseudo-random numbers may be converted to a pointer into the table to select the next list of entities 104-124 to receive modified connection-requests. In step 1506, the process generates one modified connection-request for each of the entities identified in the list, and the process goes to step 1508. Each of the modified connection-request is different from all other modified connection requests. The process modifies the connection-request by at least inserting a certification that may be an encrypted identification of the entity of which authentication proxy 1210 is a part. This certification contributes to the redirector pattern that may determine a process that the destination entity may take.

In step 1508, the process transmits the modified connection-requests to the entities in the list and goes to step 1510. In step 1510, the process checks if the authentication system is turned off. If the authentication system is turned off, the process goes to step 1514 and ends. If the authentication system is not turned off, the process returns to step 1402 of FIG. 14 (1512).

FIG. 16 shows a flow chart 1600 of an exemplary process for a server. In step 1602, the process checks if the located and decrypted one or more usernames and one or more passwords are in a white list. If the usernames and passwords are found in the white list, then the process goes to step 1604. If the usernames and passwords are not found in the white list, the process goes to step 1620 where data associated with the connection-request are deleted or saved for intrusion analysis.

In step 1604, the process attempts to decrypt the payload data based on a timestamp and randomizing parameters associated with the usernames and passwords, and the process goes to step 1606. For example, a set of decryption algorithms may be identified based on the usernames and passwords. The timestamp may be used as a seed in a pseudo-random number algorithm to pseudo-randomly select one of the decryption algorithms identified by the username and passwords. As discussed above, the timestamp is initially set according to a perceived network delay time. If the decryption fails, the timestamp may be incremented by a preset amount such as a minute, a quarter hour, an hour, etc., and an decryption attempt is made again. This continues until either the decryption is successful or all decryption attempts have failed.

In step 1606, the process determines whether the decryption was successful. If the decryption was successful, the process goes to step 1614. If the decryption was unsuccessful, the process goes to step 1608. In step 1608, the process generates a synchronizing-timestamp toward the presumed originator of the connection-request, and the process goes to step 1610. As noted earlier, the synchronizing-timestamp may be transmitted directly to the presumed connection-request originator, through redirectors, or by broadcasting or multicasting but with one or more source identities and/or one or more destination identities that identify the intended the presumed connection-request originator, for example. In step 1610, the process appropriately disposes the data associated with the connection-request and goes to step 1612 which returns to step 1402 of FIG. 14.

In step 1614, the process determines whether the payload data contains improper identification information such as a wrong MAC address, or a wrong biometric data, for example. If improper identification information is discovered, the process goes to step 1618. If all identification information is correct, the process goes to step 1616. In step 1618, the data associated with the connection-request is appropriately disposed by deletion or saved for future intrusion analysis, and the process goes to step 1612 and returns to step 1402 of FIG. 14. In step 1616, the requested connection is authenticated with respect to the processed connection-request and the process goes to step 1620. As discussed above, control is handed over to a session manager when all the received connection-requests are authenticated, for example. In step 1620, the process checks if the authentication system is turned off. If the authentication system is turned off, the process goes to step 1622 and ends. If the authentication system is not turned off, then the process goes to step 1612 which returns to step 1402 of FIG. 14.

While the invention has been described in conjunction with exemplary embodiments, these embodiments should be viewed as illustrative, not limiting. Various modifications, substitutes, or the like are possible within the spirit and scope of the invention.

What is claimed is:

1. A network authentication apparatus comprising:
  circuitry configured to:
    receive a connection-request of a first entity, the connection-request initiating a connection that traverses one or more chains of entities of a network that end at a second entity of the network; and authenticate, at one entity of the entities, the connection-request based on one or more entity-patterns representing the one or more chains of entities,
wherein at least one chain of entities of the one or more chains of entities includes at least two entities.

2. The apparatus of claim 1, further comprising:
a memory storing a table of entity-patterns, wherein the circuitry is configured to authenticate the received connection-request if an entity-pattern recorded in the received connection-request is found in the table of entity-patterns.

3. The apparatus of claim 1, wherein the circuitry is configured to perform one of a plurality of functions based on an entity-pattern recorded in the received connection-request.

4. The apparatus of claim 1, wherein the received connection-request comprises:
a plurality of data-groups, and
the circuitry is configured to access the data-groups in an order based on an entity-pattern recorded in the received connection-request.

5. A network authentication system comprising:
a first entity and a second entity interconnected by a network, wherein
the first entity is configured to transmit a connection-request, the connection request initiating a connection that traverses one or more chains of entities of the network that ends at the second entity, and
the second entity is configured to authenticate a received connection-request based on an entity-pattern representing one chain of entities recorded in a received connection-request,
wherein the one chain of entities includes at least two entities.

6. The system of claim 5, further comprising:
a plurality of third entities interconnected by the network, wherein selected ones of the third entities form the one or more chains of entities, and
sequences of the selected ones of the third entities form one or more entity-patterns.

7. The system of claim 5, wherein
the first entity comprises an authentication mediator,
the authentication mediator is configured to pseudo-randomly select one or more third entities as redirectors and generate a connection-request for each of the redirectors, and
a connection-request for one of the redirectors is different from connection-requests for all other redirectors.

8. The system of claim 7, wherein
each redirector of the redirectors is configured to pseudo-randomly select further redirectors and/or select the second entity,
each redirector is configured to modify the received connection-request by at least adding a certification to generate a modified connection-request for each of the selected further redirectors and/or the second entity, and
the certification identifies each redirector.

9. The system of claim 5, wherein
the second entity comprises an authentication proxy, and
the authentication proxy is configured to identify the second entity as a server based on one or more entity-patterns of one or more received connection-requests.

10. The system of claim 9, further comprising
a memory storing a white list of one or more usernames and one or more passwords,
wherein the authentication proxy is configured to perform a first step authentication for the received connection-request by confirming that all one or more usernames and all one or more passwords in the received connection-request are in the white list.

11. The system of claim 10, wherein
the received connection-request includes payload data,
the payload data includes further authentication information, and
the further authentication information includes:
one or more biometric data, biometric data including retina data, finger print data, voice print data, and facial data, and
one or more media access control (MAC) addresses.

12. The system of claim 11, further comprising a synchronizing timestamp, wherein the authentication proxy is configured to generate the synchronizing timestamp for transmission if decryption of the payload data failed after a successful first step authentication.

13. The network authentication system of claim 5 further comprising:
means for generating the connection-request in a client, the means for generating the connection-request including either a black box appliance in a client-workstation, or an authentication randomizer in a client-workstation and an authentication mediator in a black box appliance separated from the client-workstation by a network; and
means for authenticating the connection-request based on redirector patterns and content of received connection-requests.

14. A method for network authentication comprising:
transmitting a connection-request from a first entity, the connection-request initiating a connection that traverses one or more chains of entities in a network that end at a second entity; and
authenticating the connection-request at an entity in the network based on one or more entity-patterns representing the one or more chains of entities,
wherein at least one chain of entities of the one or more chains of entities includes at least two entities.

15. The method of claim 14 further comprising:
receiving the connection-request at the entity; and
authenticating the received connection-request if an entity-pattern recorded in the received connection-request is also recorded in the entity.

16. The method of claim 14, further comprising:
selecting one of a plurality of functions to perform based on an entity-pattern recorded in a received connection-request; and
accessing data-groups of the received connection-request in an order based on the entity-pattern recorded in the connection request.

17. The method of claim 14, further comprising:
pseudo-randomly selecting third entities of the network as redirectors; and
generating a connection-request for each of the redirectors, a connection-request for one redirector being different from connection-requests for all other redirectors.

18. The method of claim 17, further comprising:
pseudo-randomly selecting further redirectors and/or the second entity at each of the redirectors; and
modifying a received connection-request for each of the further redirectors and/or second entity by at least adding a certification that identified each redirector.

19. The method of claim 13, further comprising:
identifying the second entity as a server based on one or more entity-patterns of one or more received connection-requests; and performing a first step authentication based on one or more usernames and one or more passwords in a received connection-request.

20. The method of claim 19, further comprising:

decrypting a payload data of the received connection-request after a successful first step authentication; and generating a synchronizing-timestamp if the decrypting step failed.

* * * * *